US011279405B2

(12) United States Patent
Xu et al.

(10) Patent No.: US 11,279,405 B2
(45) Date of Patent: Mar. 22, 2022

(54) HITCH ASSIST SYSTEM

(71) Applicant: Ford Global Technologies, LLC, Dearborn, MI (US)

(72) Inventors: Li Xu, Northville, MI (US); Douglas Blue, Plymouth, MI (US); Kyle Simmons, New Boston, MI (US); Luke Niewiadomski, Dearborn, MI (US); Eric Hongtei Tseng, Canton, MI (US); Peter Ling, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 240 days.

(21) Appl. No.: 16/161,540

(22) Filed: Oct. 16, 2018

(65) Prior Publication Data
US 2020/0114968 A1    Apr. 16, 2020

(51) Int. Cl.
```
B60D 1/36      (2006.01)
B62D 15/02     (2006.01)
B62D 13/06     (2006.01)
B60D 1/24      (2006.01)
G01C 21/36     (2006.01)
```
(Continued)

(52) U.S. Cl.
CPC ......... *B62D 15/0285* (2013.01); *B60D 1/245* (2013.01); *B62D 13/06* (2013.01); *B60R 2300/806* (2013.01); *B60W 10/20* (2013.01); *B60W 2050/146* (2013.01); *B60W 2420/52* (2013.01); *B62D 15/025* (2013.01); *B62D 15/029* (2013.01); *B62D 15/0275* (2013.01); *G01C 21/3647* (2013.01); *G01C 21/3664* (2013.01); *G05D 1/0238* (2013.01); *G05D 1/0278* (2013.01)

(58) Field of Classification Search
CPC . B60D 1/245; B60W 10/20; B60W 2050/146; B60W 2420/52; B62D 13/06; B62D 15/025; B62D 15/0275; B62D 15/0285; B62D 15/029; B60R 2300/806; G01C 21/3647; G01C 21/3664; G05D 1/0238; G05D 1/0278
See application file for complete search history.

(56) References Cited

U.S. PATENT DOCUMENTS 7,777,615 B2    8/2010   Okuda et al.
9,506,774 B2   11/2016   Shutko et al.
(Continued)

FOREIGN PATENT DOCUMENTS

EP    3081405 A2    10/2016

*Primary Examiner* — Hunter B Lonsberry
*Assistant Examiner* — Matthew J. Reda
(74) *Attorney, Agent, or Firm* — Raymond Coppiellie; Price Heneveld LLP

(57) ABSTRACT

A hitch assist system is provided herein that includes a sensing system configured to detect a trailer and obstacles proximate the trailer. The hitch assist system also includes a controller in communication with the sensing system and configured to define a final vehicle heading direction relative to the trailer when a hitch ball of a vehicle is aligned with a coupler of the trailer; determine an uppermost/farthest position of the vehicle from the trailer; determine a lowermost/nearest position of the vehicle from the trailer; and determine a vehicle path that aligns the vehicle within the uppermost/farthest and lowermost/nearest positions.

14 Claims, 24 Drawing Sheets

(51) Int. Cl.
  *B60W 50/14* (2020.01)
  *G05D 1/02* (2020.01)
  *B60W 10/20* (2006.01)

(56) References Cited

U.S. PATENT DOCUMENTS

| | | | |
|---|---|---|---|
| 10,144,417 B1* | 12/2018 | Zhang | B60D 1/06 |
| 2004/0119610 A1* | 6/2004 | Maemura | B60R 1/00 |
| | | | 340/932.2 |
| 2007/0159310 A1* | 7/2007 | Ball | B60D 1/36 |
| | | | 340/431 |
| 2010/0096203 A1 | 4/2010 | Freese V et al. | |
| 2011/0054739 A1* | 3/2011 | Bammert | B62D 15/0285 |
| | | | 701/41 |
| 2015/0138340 A1* | 5/2015 | Lavoie | G06K 9/3216 |
| | | | 348/118 |
| 2015/0321666 A1 | 11/2015 | Talty et al. | |
| 2016/0052548 A1* | 2/2016 | Singh | B60D 1/36 |
| | | | 701/37 |
| 2016/0129939 A1* | 5/2016 | Singh | B62D 15/028 |
| | | | 701/41 |
| 2016/0297432 A1* | 10/2016 | Fletcher | B60D 1/36 |
| 2017/0043807 A1* | 2/2017 | Shepard | B60D 1/36 |
| 2018/0251153 A1* | 9/2018 | Li | B60D 1/06 |
| 2019/0064831 A1* | 2/2019 | Gali | B60W 10/18 |
| 2020/0097021 A1* | 3/2020 | Carpenter | G05D 1/0225 |

\* cited by examiner

HITCH ASSIST SYSTEM

FIELD OF THE INVENTION

The present disclosure generally relates to autonomous and semi-autonomous vehicle systems, and more particularly, to hitch assist systems that facilitate the hitching of a vehicle to a trailer.

BACKGROUND OF THE INVENTION

The process of hitching a vehicle to a trailer can be difficult, especially to those lacking experience. Accordingly, there is a need for a system that simplifies the process by assisting a user in a simple yet intuitive manner.

SUMMARY OF THE INVENTION

According to some aspects of the present disclosure, a hitch assist system is provided herein. The hitch assist system includes a sensing system configured to detect a trailer and an obstacle proximate the trailer. The hitch assist system further includes a controller in communication with the sensing system and configured to define a vehicle heading direction when a hitch ball of a vehicle is aligned with a coupler of the trailer; determine an uppermost position of the vehicle; determine a lowermost position of the vehicle; and determine a vehicle path that aligns a hitch assembly of the vehicle with a coupler of the trailer within the uppermost and lowermost positions.

According to some aspects of the present disclosure, a hitch assist method is provided herein. The method includes detecting a coupler of a trailer. The method also includes detecting an uppermost position between a vehicle and an object. The method further includes detecting a lowermost position between the vehicle and the trailer. Additionally, the method includes defining a vehicle backup path having one or more non-linear segments. Lastly, the method includes aligning a hitch ball with the coupler at a predefined offset angle between the trailer and vehicle.

According to some aspects of the present disclosure, a hitch assist system is provided herein. The hitch assist system includes a sensing system configured to detect a trailer and an obstacle proximate the trailer. The hitch assist system further includes a controller in communication with the sensing system and configured to define a vehicle heading direction when a hitch ball of a vehicle is aligned with a coupler of the trailer; maneuver the vehicle to an uppermost position proximate the obstacle; and determine a vehicle path that aligns the coupler with the hitch ball from the uppermost position.

These and other aspects, objects, and features of the present invention will be understood and appreciated by those skilled in the art upon studying the following specification, claims, and appended drawings.

DETAILED DESCRIPTION OF THE PREFERRED EXAMPLES

Figure 1:
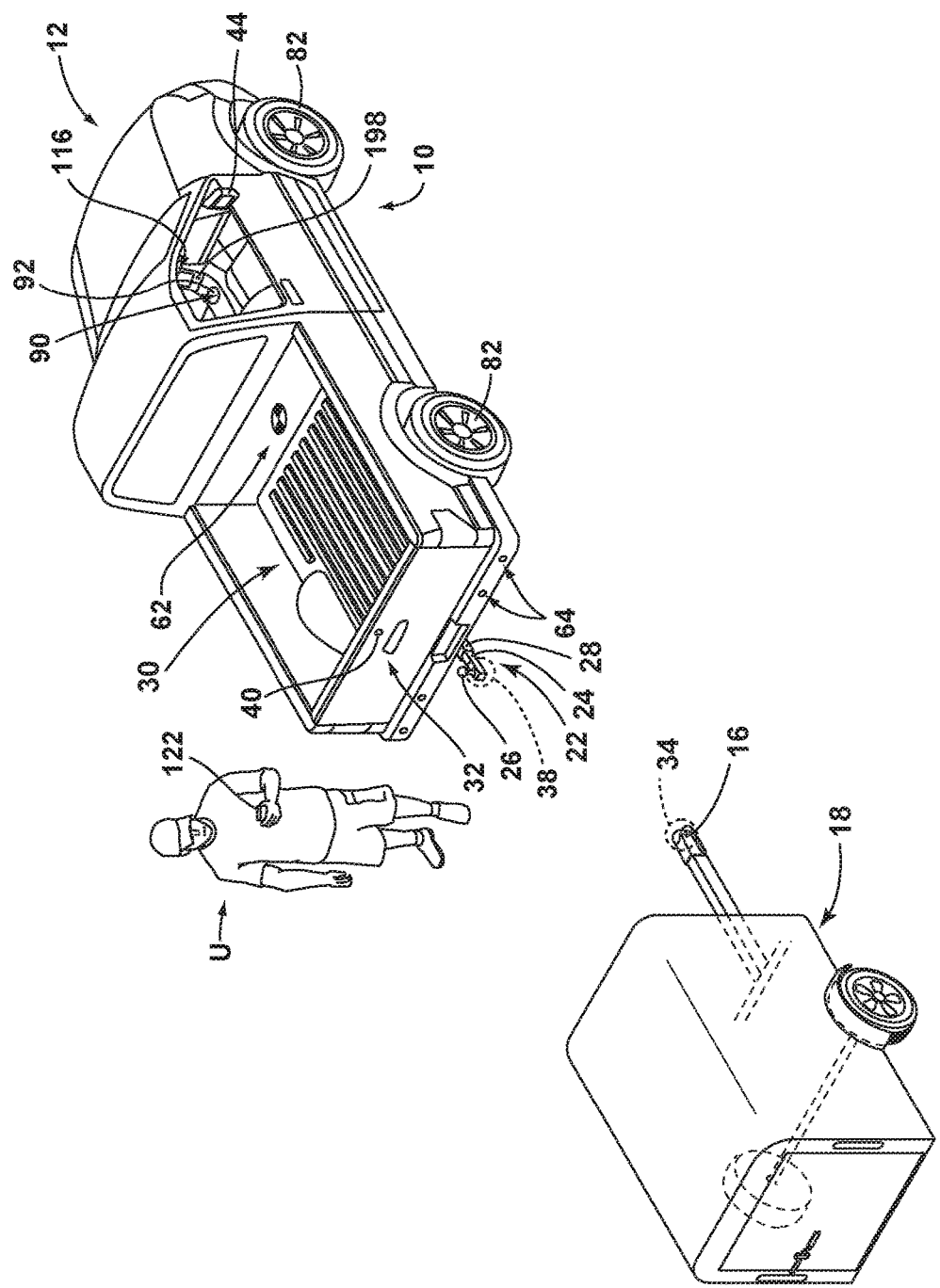
FIG. 1 is a top perspective view of a vehicle and a trailer, the vehicle being equipped with a hitch assistance system (also referred to as a "hitch assist" system), according to some examples.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary examples of the inventive concepts defined in the appended claims. Hence, specific dimensions and other physical characteristics relating to the examples disclosed herein are not to be considered as limiting, unless the claims expressly state otherwise.

As required, detailed examples of the present invention are disclosed herein. However, it is to be understood that the disclosed examples are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises" does not, without more constraints, preclude the existence of additional identical elements in the process, method, article, or apparatus that comprises the element.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The following disclosure describes a hitch assist system for a vehicle. A hitch assist system is provided herein that includes a sensing system configured to detect a trailer and an obstacle proximate the trailer. The hitch assist system also includes a controller in communication with the sensing system and configured to define a vehicle heading direction when a hitch ball of a vehicle is aligned with a coupler of the trailer; determine an uppermost position of the vehicle; determine a lowermost position of the vehicle; and determine a vehicle path that aligns the vehicle within the uppermost and lowermost positions.

Figure 2:
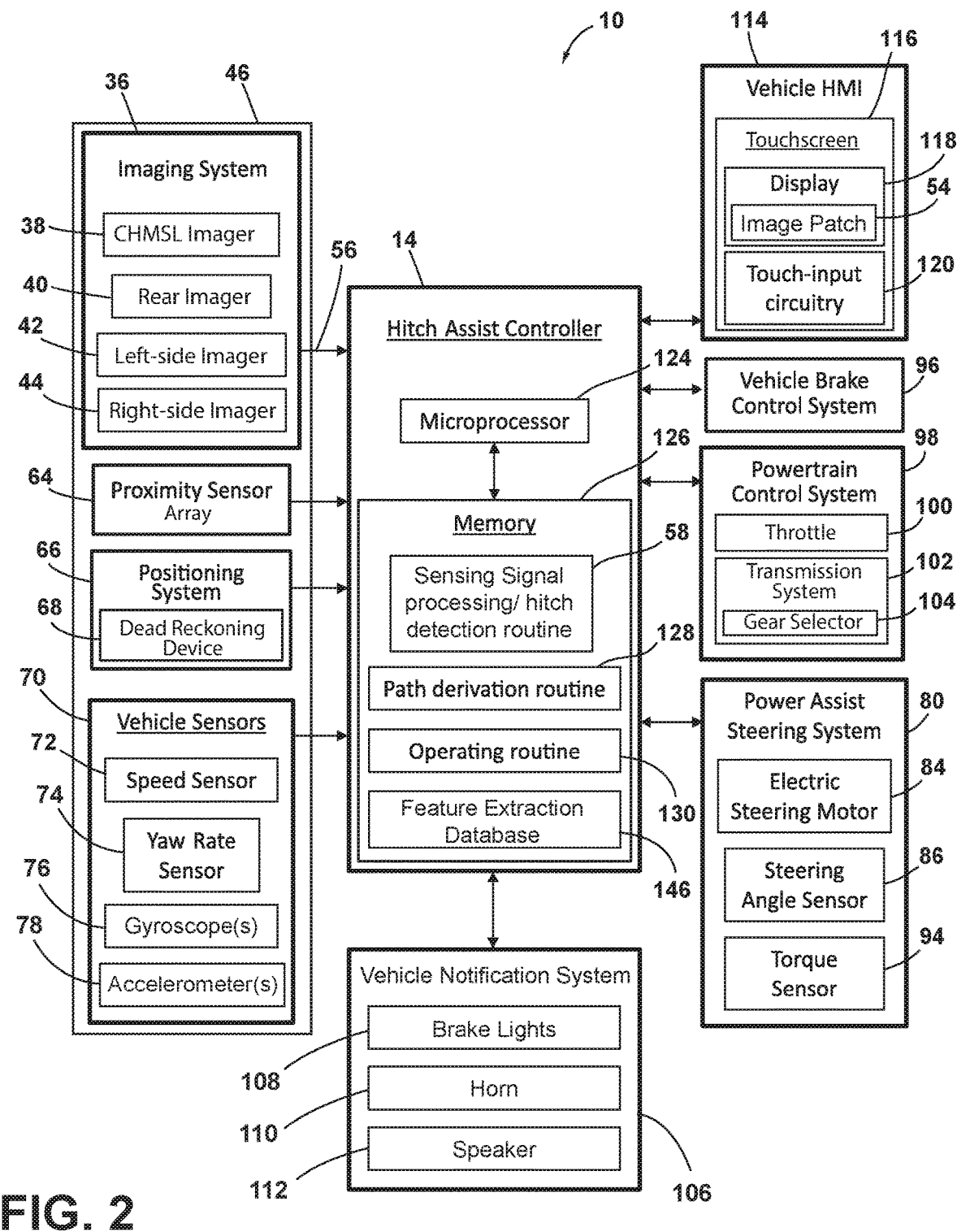
FIG. 2 is a block diagram illustrating various components of the hitch assist system, according to some examples.

Referring to FIGS. 1 and 2, reference numeral 10 designates a hitch assist system for a vehicle 12. In particular, the hitch assist system 10 includes a controller 14 acquiring position data of a coupler 16 of a trailer 18 and deriving a vehicle path 20 (FIG. 3) to align a hitch assembly 22 of the vehicle 12 with the coupler 16. In some examples, the hitch assembly 22 may include a ball mount 24 supporting a hitch ball 26. The hitch ball 26 may be fixed on the ball mount 24 that extends from the vehicle 12 and/or the hitch ball 26 may be fixed to a portion of the vehicle 12, such as a bumper of the vehicle 12. In some examples, the ball mount 24 may couple with a receiver 28 that is fixed to the vehicle 12.

As shown in FIG. 1, the vehicle 12 is exemplarily embodied as a pickup truck having a truck bed 30 that is accessible via a rotatable tailgate 32. The hitch ball 26 may be received by a coupler 16 in the form of a coupler ball socket 34 that is provided at a terminal end portion of the trailer coupler 16. The trailer 18 is exemplarily embodied as a single axle trailer from which the coupler 16 extends longitudinally. It will be appreciated that additional examples of the trailer 18 may alternatively couple with the vehicle 12 to provide a pivoting connection, such as by connecting with a fifth wheel connector. It is also contemplated that additional examples of the trailer 18 may include more than one axle and may have various shapes and sizes configured for different loads and items, such as a boat trailer or a flatbed trailer without departing from the teachings provided herein.

With respect to the general operation of the hitch assist system 10, as illustrated in FIG. 2, the hitch assist system 10 includes a sensing system 46 that includes various sensors and devices that obtain or otherwise provide vehicle status-related information. For example, in some instances, the sensing system 46 incorporates an imaging system 36 that includes one or more exterior imagers 38, 40, 42, 44, or any other vision-based device. The one or more imagers 38, 40, 42, 44 each include an area-type image sensor, such as a CCD or a CMOS image sensor, and image-capturing optics that capture an image of an imaging field of view (e.g., fields of view 48, 50, 52a, 52b, FIG. 5) defined by the image-capturing optics. In some instances, the one or more imagers 38, 40, 42, 44 may derive an image patch 54 from multiple image frames that may be shown on a display 118. In various examples, the hitch assist system 10 may include any one or more of a center high-mount stop light (CHMSL) imager 38, a rear imager 40, a left-side side-view imager 42, and/or a right-side side-view imager 44, although other arrangements including additional or alternative imagers are possible without departing from the scope of the present disclosure.

In some examples, the imaging system 36 can include the rear imager 40 alone or can be configured such that the hitch assist system 10 utilizes only the rear imager 40 in a vehicle 12 with the multiple exterior imagers 38, 40, 42, 44. In some instances, the various imagers 38, 40, 42, 44 included in the imaging system 36 can be positioned to generally overlap in their respective fields of view, which in the depicted arrangement of FIG. 5 includes fields of view 48, 50, 52a, 52b to correspond with the CHMSL imager 38, the rear imager 40, and the side-view imagers 42 and 44, respectively. In this manner, image data 56 from two or more of the imagers 38, 40, 42, 44 can be combined in an image/signal processing routine 58, or in another dedicated image/signal processor within the imaging system 36, into a single image or image patch 54. In an extension of such examples, the image data 56 can be used to derive stereoscopic image data 56 that can be used to reconstruct a three-dimensional scene of the area or areas within overlapped areas of the various fields of view 48, 50, 52a, 52b, including any objects (e.g., obstacles or the coupler 16) therein.

In some examples, the use of two images including the same object can be used to determine a location of the object relative to the two imagers 38, 40, 42, and/or 44, given a known spatial relationship between the imagers 38, 40, 42, 44 through projective geometry of the imagers 38, 40, 42, 44. In this respect, the image/signal processing routine 58 can use known programming and/or functionality to identify an object within the image data 56 from the various imagers 38, 40, 42, 44 within the imaging system 36. The image/signal processing routine 58 can include information related to the positioning of any of the imagers 38, 40, 42, 44 present on the vehicle 12 or utilized by the hitch assist system 10, including relative to a center 62 (FIG. 1) of the vehicle 12. For example, the positions of the imagers 38, 40, 42, 44 relative to the center 62 of the vehicle 12 and/or to each other can be used for object positioning calculations and to result in object position data relative to the center 62 of the vehicle 12, for example, or other features of the vehicle 12, such as the hitch ball 26 (FIG. 1), with known positions relative to the center 62 of the vehicle 12 in a manner similar to that which is described in commonly assigned U.S. patent application Ser. No. 15/708,427, filed Sep. 19, 2017, and entitled "HITCH ASSIST SYSTEM WITH COUPLER IDENTIFICATION FEATURE AND COUPLER HEIGHT ESTIMATION," now U.S. Pat. No. 10,363,874, the entire disclosure of which is incorporated by reference herein.

With further reference to FIGS. 1 and 2, a proximity sensor 64 or an array thereof, and/or other vehicle sensors 70, may provide sensor signals that the controller 14 of the hitch assist system 10 processes with various routines to determine various objects proximate the vehicle 12, the trailer 18, and/or the coupler 16 of the trailer 18. The proximity sensor 64 may also be utilized to determine a height and position of the coupler 16. The proximity sensor 64 may be configured as any type of sensor, such as an ultrasonic sensor, a radio detection and ranging (radar) sensor, a sound navigation and ranging (SONAR) sensor, a light detection and ranging (LIDAR) sensor, a vision-based sensor, and/or any other type of sensor known in the art.

Figure 3:
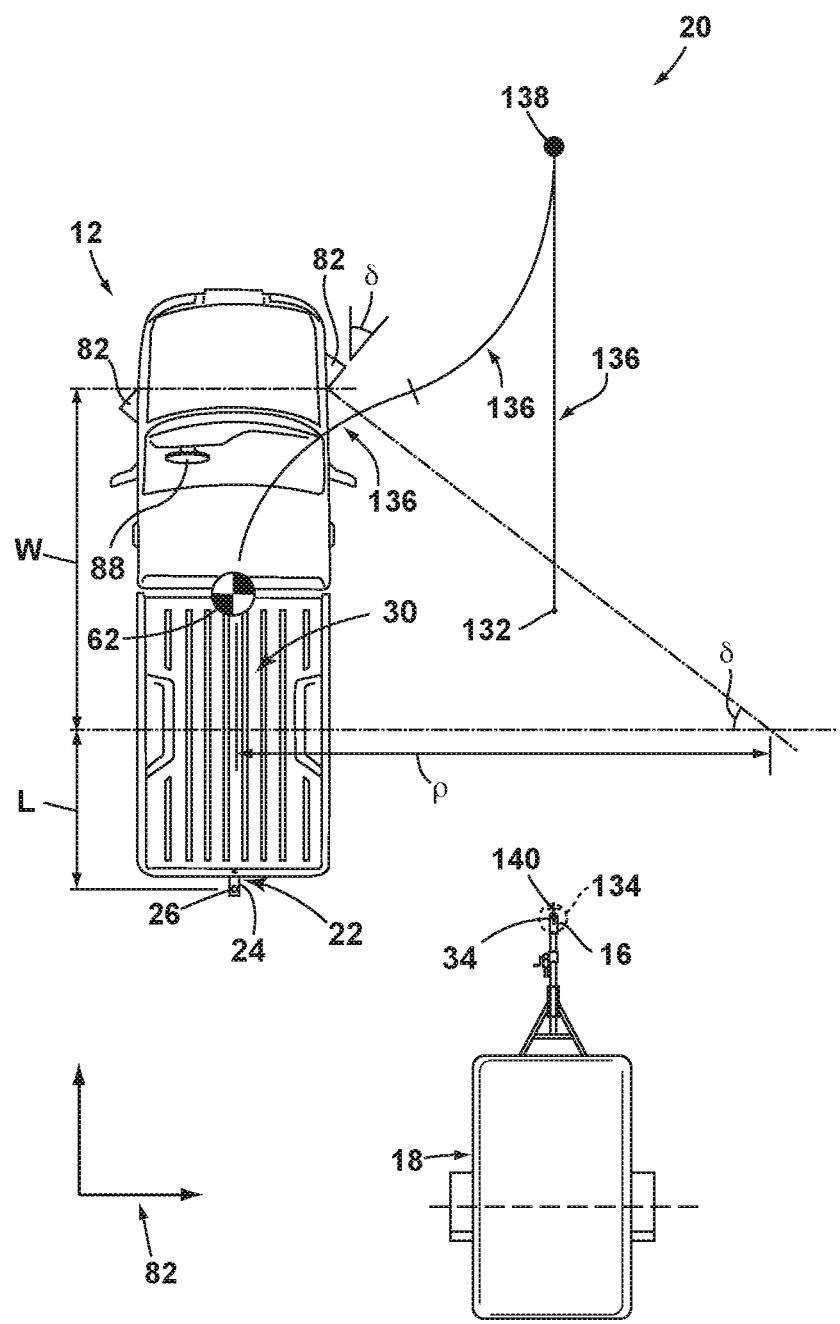
FIG. 3 is an overhead schematic view of the vehicle during a step of the alignment sequence with the trailer, according to some examples.
Figure 4:
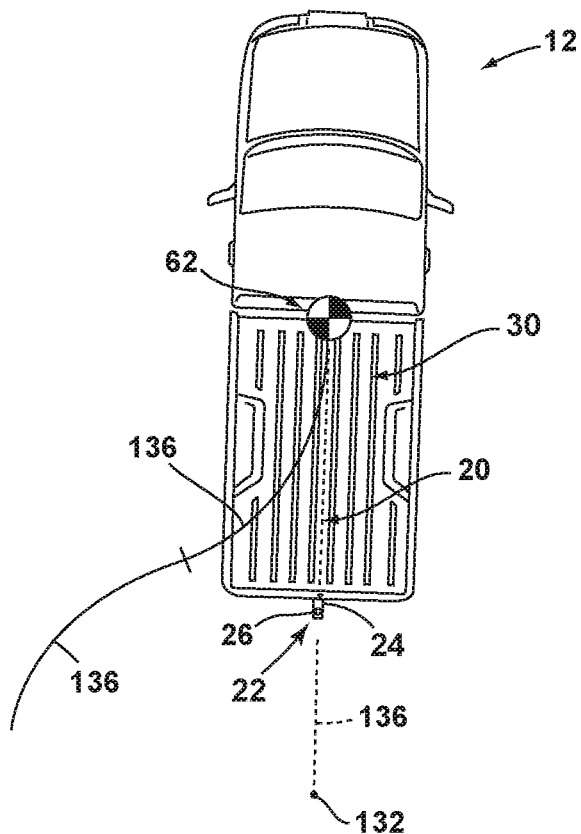
FIG. 4 is an overhead schematic view of the vehicle during a subsequent step of the alignment sequence with the trailer, according to some examples.
Figure 4:
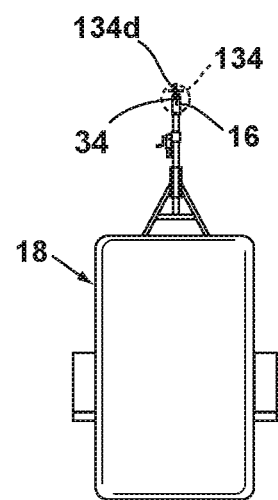

Referring still to FIGS. 1 and 2, a positioning system 66, may include a dead reckoning device 68 or, in addition, or as an alternative, a global positioning system (GPS) that determines a coordinate location of the vehicle 12. For example, the dead reckoning device 68 can establish and track the coordinate location of the vehicle 12 within a localized coordinate system based at least on vehicle speed and/or steering angle δ (FIG. 3). The controller 14 may also be operably coupled with various vehicle sensors 70, such as a speed sensor 72 and a yaw rate sensor 74. Additionally, the controller 14 may communicate with one or more gyroscopes 76 and accelerometers 78 to measure the position, orientation, direction, and/or speed of the vehicle 12.

To enable autonomous or semi-autonomous control of the vehicle 12, the controller 14 of the hitch assist system 10 may be further configured to communicate with a variety of vehicle systems. According to some examples, the controller 14 of the hitch assist system 10 may control a power assist steering system 80 of the vehicle 12 to operate the steered road wheels 82 of the vehicle 12 while the vehicle 12 moves along a vehicle path 20. The power assist steering system 80 may be an electric power-assisted steering (EPAS) system that includes an electric steering motor 84 for turning the steered road wheels 82 to a steering angle δ based on a steering command generated by the controller 14, whereby the steering angle δ may be sensed by a steering angle sensor 86 of the power assist steering system 80 and provided to the controller 14. As described herein, the steering command may be provided for autonomously steering the vehicle 12 during a maneuver and may alternatively be provided manually via a rotational position (e.g., a steering wheel angle) of a steering wheel 88 (FIG. 3) or a steering input device 90, which may be provided to enable a driver to control or otherwise modify the desired curvature of the path 20 of vehicle 12. The steering input device 90 may be communicatively coupled to the controller 14 in a wired or wireless manner and provides the controller 14 with information defining the desired curvature of the path 20 of the vehicle 12. In response, the controller 14 processes the information and generates corresponding steering commands that are supplied to the power assist steering system 80 of the vehicle 12. In some examples, the steering input device 90 includes a rotatable knob 92 operable between a number of rotated positions that each provides an incremental change to the desired curvature of the path 20 of the vehicle 12.

In some examples, the steering wheel 88 of the vehicle 12 may be mechanically coupled with the steered road wheels 82 of the vehicle 12, such that the steering wheel 88 moves in concert with steered road wheels 82 via an internal torque during autonomous steering of the vehicle 12. In such instances, the power assist steering system 80 may include a torque sensor 94 that senses torque (e.g., gripping and/or turning) on the steering wheel 88 that is not expected from the autonomous control of the steering wheel 88 and therefore is indicative of manual intervention by the driver. In some examples, the external torque applied to the steering wheel 88 may serve as a signal to the controller 14 that the driver has taken manual control and for the hitch assist system 10 to discontinue autonomous steering functionality. However, as provided in more detail below, the hitch assist system 10 may continue one or more functions/operations while discontinuing the autonomous steering of the vehicle.

The controller 14 of the hitch assist system 10 may also communicate with a vehicle brake control system 96 of the vehicle 12 to receive vehicle speed information such as individual wheel speeds of the vehicle 12. Additionally or alternatively, vehicle speed information may be provided to the controller 14 by a powertrain control system 98 and/or the vehicle speed sensor 72, among other conceivable means. The powertrain control system 98 may include a throttle 100 and a transmission system 102. A gear selector 104 may be disposed within the transmission system 102 that controls the mode of operation of the vehicle transmission system 102 through one or more gears of the transmission system 102. In some examples, the controller 14 may provide braking commands to the vehicle brake control system 96, thereby allowing the hitch assist system 10 to regulate the speed of the vehicle 12 during a maneuver of the vehicle 12. It will be appreciated that the controller 14 may additionally or alternatively regulate the speed of the vehicle 12 via interaction with the powertrain control system 98.

Through interaction with the power assist steering system 80, the vehicle brake control system 96, and/or the powertrain control system 98 of the vehicle 12, the potential for unacceptable conditions can be reduced when the vehicle 12 is moving along the path 20. Examples of unacceptable conditions include, but are not limited to, a vehicle overspeed condition, sensor failure, and the like. In such circumstances, the driver may be unaware of the failure until the unacceptable backup condition is imminent or already happening. Therefore, it is disclosed herein that the controller 14 of the hitch assist system 10 can generate an alert signal corresponding to a notification of an actual, impending, and/or anticipated unacceptable backup condition, and prior to driver intervention, generate a countermeasure to prevent such an unacceptable backup condition.

According to some examples, the controller 14 may communicate with one or more devices, including a vehicle notification system 106, which may prompt visual, auditory, and tactile notifications and/or warnings. For instance, vehicle brake lights 108 and/or vehicle emergency flashers may provide a visual alert. A vehicle horn 110 and/or speaker 112 may provide an audible alert. Additionally, the controller 14 and/or vehicle notification system 106 may communicate with a user-input device, such as a human-machine interface (HMI) 114 of the vehicle 12. The HMI 114 may include a touchscreen 116, or other user-input device, such as a navigation and/or entertainment display 118 mounted within a cockpit module, an instrument cluster, and/or any other location within the vehicle 12, which may be capable of displaying images, indicating the alert.

In some instances, the HMI 114 further includes an input device, which can be implemented by configuring the display 118 as a portion of the touchscreen 116 with circuitry 120 to receive an input corresponding with a location over the display 118. Other forms of input, including one or more joysticks, digital input pads, or the like can be used in place or in addition to touchscreen 116.

Further, the hitch assist system 10 may communicate via wired and/or wireless communication with some instances of the HMI 114 and/or with one or more handheld or portable devices 122 (FIG. 1), which may additionally and/or alternatively be configured as the user-input device. The network may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services.

The portable device 122 may also include the display 118 for displaying one or more images and other information to a user U. For instance, the portable device 122 may display one or more images of the trailer 18 on the display 118 and may be further able to receive remote user inputs via touchscreen circuitry 120. In addition, the portable device 122 may provide feedback information, such as visual, audible, and tactile alerts. It will be appreciated that the portable device 122 may be any one of a variety of computing devices and may include a processor and memory. For example, the portable device 122 may be a cell phone, mobile communication device, key fob, wearable device (e.g., fitness band, watch, glasses, jewelry, wallet), apparel (e.g., a tee shirt, gloves, shoes or other accessories), personal digital assistant, headphones and/or other devices that include capabilities for wireless communications and/or any wired communications protocols.

The controller 14 is configured with a microprocessor 124 and/or other analog and/or digital circuitry for processing one or more logic routines stored in a memory 126. The logic routines may include one or more routines including the image/signal processing routine 58, a hitch detection routine, a path derivation routine 128, and an operating routine 130. Information from the imager 40 or other components of the sensing system 46 can be supplied to the controller 14 via a communication network of the vehicle 12, which can include a controller area network (CAN), a local interconnect network (LIN), or other protocols used in the automotive industry. It will be appreciated that the controller 14 may be a stand-alone dedicated controller or may be a shared controller integrated with the imager 40 or other component of the hitch assist system 10 in addition to any other conceivable onboard or off-board vehicle control systems.

The controller 14 may include any combination of software and/or processing circuitry suitable for controlling the various components of the hitch assist system 10 described herein including without limitation microprocessors, microcontrollers, application-specific integrated circuits, programmable gate arrays, and any other digital and/or analog components, as well as combinations of the foregoing, along with inputs and outputs for transceiving control signals, drive signals, power signals, sensor signals, and so forth. All such computing devices and environments are intended to fall within the meaning of the term "controller" or "processor" as used herein unless a different meaning is explicitly provided or otherwise clear from the context.

With further reference to FIGS. 2-6, the controller 14 may generate vehicle steering information and commands as a function of all or a portion of the information received. Thereafter, the vehicle steering information and commands may be provided to the power assist steering system 80 for effecting the steering of the vehicle 12 to achieve a commanded path 20 of travel for alignment with the coupler 16 of the trailer 18. It will further be appreciated that the image/signal processing routine 58 may be carried out by a dedicated processor, for example, within a stand-alone imaging system 36 for the vehicle 12 that can output the results of its image/signal processing to other components and systems of vehicle 12, including the microprocessor 124. Further, any system, computer, processor, or the like that completes image/signal processing functionality, such as that described herein, may be referred to herein as an "image/signal processor" regardless of other functionality it may also implement (including simultaneously with executing the image/signal processing routine 58).

In some examples, the image/signal processing routine 58 can be programmed or otherwise configured to locate the coupler 16 within the image data 56. In some instances, the image/signal processing routine 58 can identify the coupler 16 within the image data 56 based on stored or otherwise known visual characteristics of the coupler 16 or hitches in general. In some instances, a marker in the form of a sticker or the like may be affixed with trailer 18 in a specified position relative to coupler 16 in a manner similar to that which is described in commonly assigned U.S. Pat. No. 9,102,271, entitled "TRAILER MONITORING SYSTEM AND METHOD," the entire disclosure of which is incorporated by reference herein. In such examples, the image/signal processing routine 58 may be programmed with identifying characteristics of the marker for location in the image data 56, as well as the positioning of the coupler 16 relative to such a marker so that the location of the coupler 16 can be determined based on the marker location. Additionally or alternatively, the controller 14 may seek confirmation of the coupler 16, via a prompt on the touchscreen 116 and/or the portable device 122. If the coupler 16 determination is not confirmed, further image/signal processing may be provided, or user-adjustment of the position 134 of the coupler 16 may be facilitated, either using the touchscreen 116 or another input to allow the user U to move the depicted position 134 of the coupler 16 on the touchscreen 116, which the controller 14 uses to adjust the determination of the position 134 of the coupler 16 with respect to the vehicle 12 based on the above-described use of the image data 56.

Alternatively, the user U can visually determine the position 134 of the coupler 16 within an image presented on HMI 114 and can provide a touch input in a manner similar to that which is described in co-pending, commonly-assigned U.S. patent application Ser. No. 15/583,014, filed May 1, 2017, and entitled "SYSTEM TO AUTOMATE HITCHING A TRAILER," now U.S. Pat. No. 10,266,023 the entire disclosure of which is incorporated by reference herein. The image/signal processing routine 58 can then correlate the location of the touch input with the coordinate system applied to the image patch 54.

As shown in FIGS. 3-6, in some exemplary instances of the hitch assist system 10, the image/signal processing routine 58 and operating routine 130 may be used in conjunction with each other to determine the path 20 along which the hitch assist system 10 can guide the vehicle 12 to align the hitch ball 26 and the coupler 16 of the trailer 18. In the example shown, an initial position of the vehicle 12 relative to the trailer 18 may be such that the coupler 16 is in the field of view 52a of the side imager 42, with the vehicle 12 being positioned latitudinally from the trailer 18 but with the coupler 16 being almost longitudinally aligned with the hitch ball 26. In this manner, upon initiation of the hitch assist system 10, such as by user input on the touchscreen 116, for example, the image/signal processing routine 58 can identify the coupler 16 within the image data 56 of the imager 42 and estimate the position 134 of the coupler 16 relative to the hitch ball 26 using the image data 56 in accordance with the examples discussed above or by other known means, including by receiving focal length information within image data 56 to determine a distance $D_c$ to the coupler 16 and an angle $\alpha_c$ of offset between the coupler 16 and the longitudinal axis of vehicle 12. Once the positioning $D_c$, $\alpha_c$ of the coupler 16 has been determined and, optionally, confirmed by the user U, the controller 14 can take control of at least the vehicle steering system 80 to control the movement of the vehicle 12 along the desired path 20 to align the vehicle hitch ball 26 with the coupler 16.

Continuing with reference to FIG. 3, the controller 14 (FIG. 2), having estimated the positioning $D_c$, $\alpha_c$ of the coupler 16, as discussed above, can, in some examples, execute the path derivation routine 128 to determine the vehicle path 20 to align the vehicle hitch ball 26 with the coupler 16. The controller 14 can store various characteristics of vehicle 12, including a wheelbase W, a distance L from the rear axle to the hitch ball 26 as well as a maximum angle to which the steered wheels 82 can be turned $\delta_{max}$. As shown, the wheelbase W and the current steering angle $\delta$ can be used to determine a corresponding turning radius $\rho$ for the vehicle 12 according to the equation:

$$\rho = \frac{W}{\tan\delta} \quad (1)$$

in which the wheelbase W is fixed and the steering angle $\delta$ can be controlled by the controller 14 by communication with the steering system 80, as discussed above. In this manner, when the maximum steering angle $\delta_{max}$ is known, the smallest possible value for the turning radius $\rho_{min}$ is determined as:

$$\rho_{min} = \frac{W}{\tan\delta_{max}} \quad (2)$$

The path derivation routine 128 can be programmed to derive the vehicle path 20 to align a known location of the vehicle hitch ball 26 with the estimated position 134 of the coupler 16 that takes into account the determined minimum turning radius $\rho_{min}$, which may allow the path 20 to use the minimum amount of space and maneuvers. In this manner, the path derivation routine 128 can use the position of the vehicle 12, which can be based on the center 62 of the vehicle 12, a location along the rear axle, the location of the dead reckoning device 68, or another known location on the coordinate system, to determine both a lateral distance to the coupler 16 and a forward or rearward distance to coupler 16 and derive the path 20 that achieves lateral and/or forward-backward movement of the vehicle 12 within the limitations of the steering system 80. The derivation of the path 20 further takes into account the positioning of the hitch ball 26 relative to the tracked location of vehicle 12 (which may correspond with the center 62 of mass of the vehicle 12, the location of a GPS receiver, or another specified, known area) to determine the needed positioning of the vehicle 12 to align the hitch ball 26 with the coupler 16.

Once the projected path 20, including the endpoint 132, has been determined, the controller 14 may at least control the steering system 80 of the vehicle 12 with the powertrain control system 98 and the brake control system 96 (whether controlled by the driver or by the controller 14) controlling the speed (forward or rearward) of the vehicle 12. In this manner, the controller 14 can receive data regarding the position of the vehicle 12 during movement thereof from the positioning system 66 while controlling the steering system 80 to maintain the vehicle 12 along the path 20. The path 20, having been determined based on the vehicle 12 and the geometry of steering system 80, can adjust the steering angle $\delta$, as dictated by the path 20, depending on the position of the vehicle 12 therealong.

As illustrated in FIG. 3, the initial positioning of the trailer 18 relative to the vehicle 12 may be such that forward movement of vehicle 12 is needed for the desired vehicle path 20, such as when the trailer 18 is latitudinally offset to the side of vehicle 12. In this manner, the path 20 may include various segments 136 of forward driving and/or rearward driving of the vehicle 12 separated by inflection points 138 at which the vehicle 12 transitions between forward and rearward movement. As used herein, "inflection points" are any point along the vehicle path 20 in which a vehicle condition is changed. The vehicle conditions include, but are not limited to, a change in speed, a change in steering angle $\delta$, a change in vehicle direction, and/or any other possible vehicle condition that may be adjusted. For example, if a vehicle speed is altered, an inflection point 138 may be at the location where the speed was altered. In some examples, the path derivation routine 128 can be configured to include a straight backing segment 136 for a defined distance before reaching the point at which the hitch ball 26 is aligned with the position 134 of the coupler 16. The remaining segments 136 can be determined to achieve the lateral and forward/backward movement within the smallest area possible and/or with the lowest number of overall segments 136 or inflection points 138. In the illustrated example of FIG. 3, the path 20 can include two segments 136 that collectively traverse the lateral movement of the vehicle 12, while providing a segment 136 of straight rearward backing to bring the hitch ball 26 into an offset position 134 of the coupler 16, one of which includes forward driving with a maximum steering angle $\delta_{max}$ in the rightward-turning direction and the other including forward driving with a maximum steering angle $\delta_{max}$ in the leftward-turning direction. Subsequently, an inflection point 138 is included in which the vehicle 12 transitions from forward driving to rearward driving followed by the previously-mentioned straight rearward backing segment 136. It is noted that variations in the depicted path 20 may be used, including a variation with a single forward-driving segment 136 at a rightward steering angle δ less than the maximum steering angle $δ_{max}$, followed by an inflection point 138 and a rearward driving segment 136 at a maximum leftward steering angle $δ_{max}$ with a shorter straight backing segment 136, with still further paths 20 being possible.

In some instances, the hitch assist system 10 may be configured to operate with the vehicle 12 in reverse only, in which case, the hitch assist system 10 can prompt the driver to drive vehicle 12, as needed, to position the trailer 18 in a designated area relative to the vehicle 12, including to the rear thereof so that path derivation routine 128 can determine a vehicle path 20 that includes rearward driving. Such instructions can further prompt the driver to position the vehicle 12 relative to the trailer 18 to compensate for other limitations of the hitch assist system 10, including a particular distance for identification of the coupler 16, a minimum offset angle $α_c$, or the like. It is further noted that the estimates for the positioning $D_c$, $α_c$ of the coupler 16 may become more accurate as the vehicle 12 traverses the path 20, including to position the vehicle 12 in front of the trailer 18 and as the vehicle 12 approaches the coupler 16. Accordingly, such estimates can be derived and used to update the path derivation routine 128, if desired, in the determination of the adjusted initial endpoint 132 for the path 20.

Figure 5:
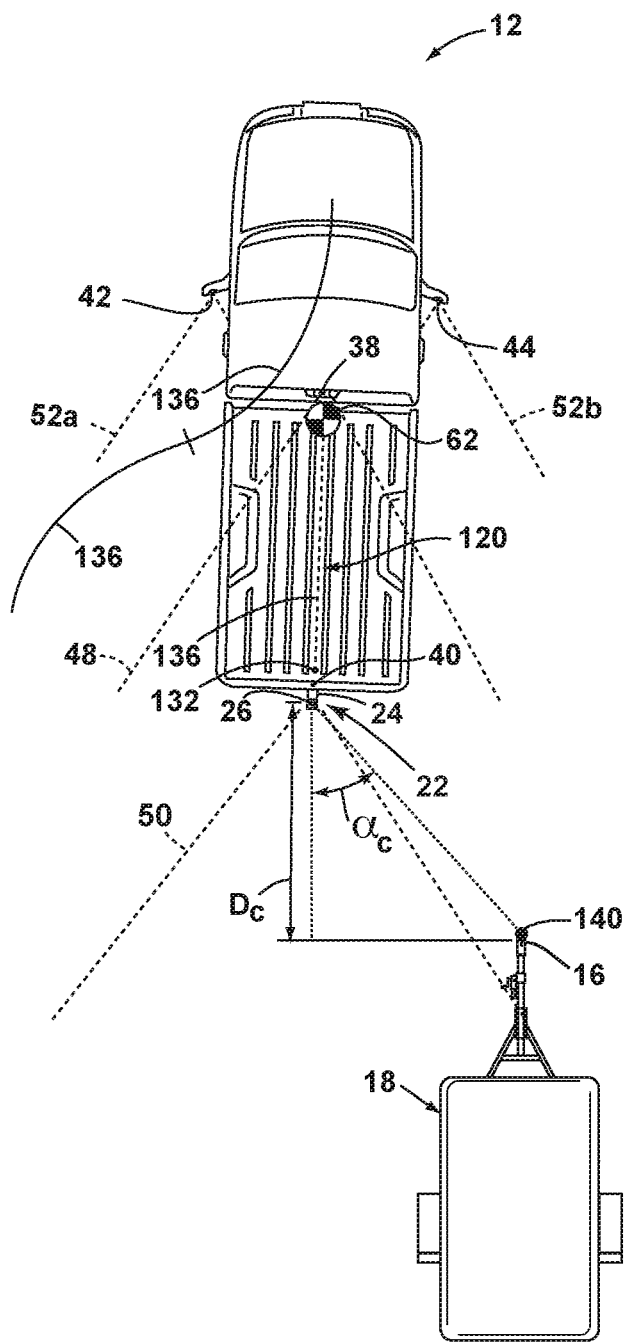
FIG. 5 is an overhead schematic view of the vehicle during a subsequent step of the alignment sequence with the trailer, according to some examples.
Figure 6:
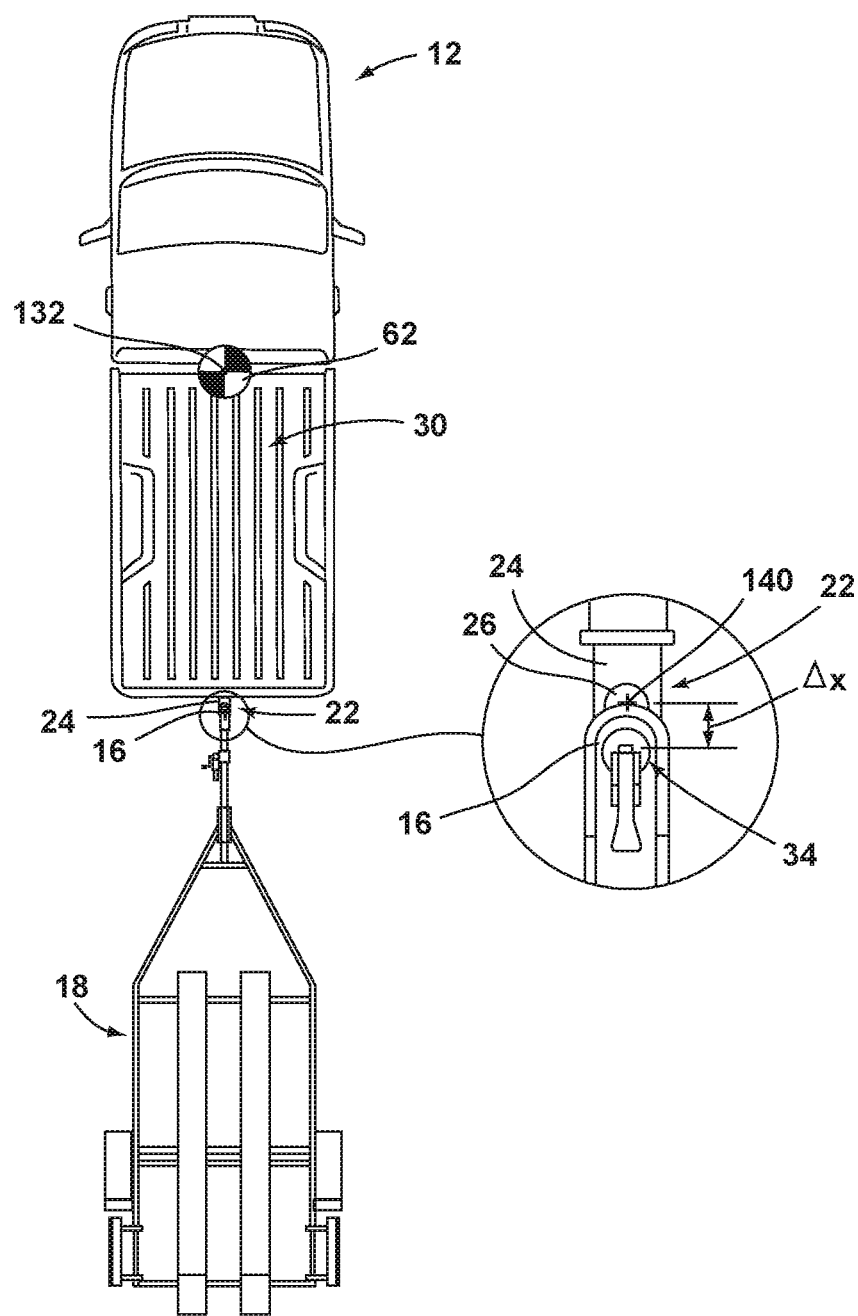
FIG. 6 is an overhead schematic view of the vehicle during a subsequent step of the alignment sequence with the trailer and showing the position of a hitch ball of the vehicle at an end of a derived alignment path, according to some examples.

Referring to FIGS. 5 and 6, a strategy for determining an initial endpoint 132 for the vehicle path 20 that places hitch ball 26 in a projected position for alignment with the coupler 16 involves calculating the actual or an approximate trajectory for movement of the coupler 16 while lowering the coupler 16 onto the hitch ball 26. The initial endpoint 132 is then derived, as discussed above or otherwise, to place hitch ball 26 at the desired location 140 on that trajectory. In effect, such a scheme is implemented by determining the difference between the height $H_c$ of the coupler 16 and the height $H_{hb}$ of the hitch ball 26, which represents the vertical distance by which coupler 16 will be lowered to engage with hitch ball 26. The determined trajectory is then used to relate the vertical distance with a corresponding horizontal distance $Δx$ of coupler 16 movement in the driving direction that results from the vertical distance. This horizontal distance $Δx$ can be input into the path derivation routine 128 as the desired initial endpoint 132 thereof or can be applied as an offset to the initial endpoint 132 derived from the initially determined position 134 of the coupler 16 when the path 20 ends with the straight-backing segment 136, as illustrated in FIG. 3.

Referring again to FIGS. 5 and 6, the operating routine 130 may continue to guide the vehicle 12 until the hitch ball 26 is in the desired final endpoint 140 relative to the coupler 16 for the coupler 16 to engage with the hitch ball 26 when the coupler 16 is lowered into alignment and/or engagement therewith. In the examples discussed above, the image/signal processing routine 58 monitors the positioning $D_c$, $α_c$ of the coupler 16 during execution of the operating routine 130, including as the coupler 16 comes into clearer view of the rear imager 40 with continued movement of the vehicle 12 along the path 20. As discussed above, the position of the vehicle 12 can also be monitored by the dead reckoning device 68 with the position 134 of the coupler 16 being updated and fed into the path derivation routine 128 in case the path 20 and/or the initial endpoint 132 can be refined or should be updated (due to, for example, improved height $H_c$, distance $D_c$, or offset angle $α_c$ information due to closer resolution or additional image data 56), including as the vehicle 12 moves closer to the trailer 18. In some instances, the coupler 16 can be assumed static such that the position of the vehicle 12 can be tracked by continuing to track the coupler 16 to remove the need for use of the dead reckoning device 68. In a similar manner, a modified variation of the operating routine 130 can progress through a predetermined sequence of maneuvers involving steering of the vehicle 12 at or below a maximum steering angle $δ_{max}$, while tracking the position $D_c$, $α_c$ of the coupler 16 to converge the known relative position of the hitch ball 26 to the desired final endpoint 140 thereof relative to the tracked position 134 of the coupler 16.

Figure 7:
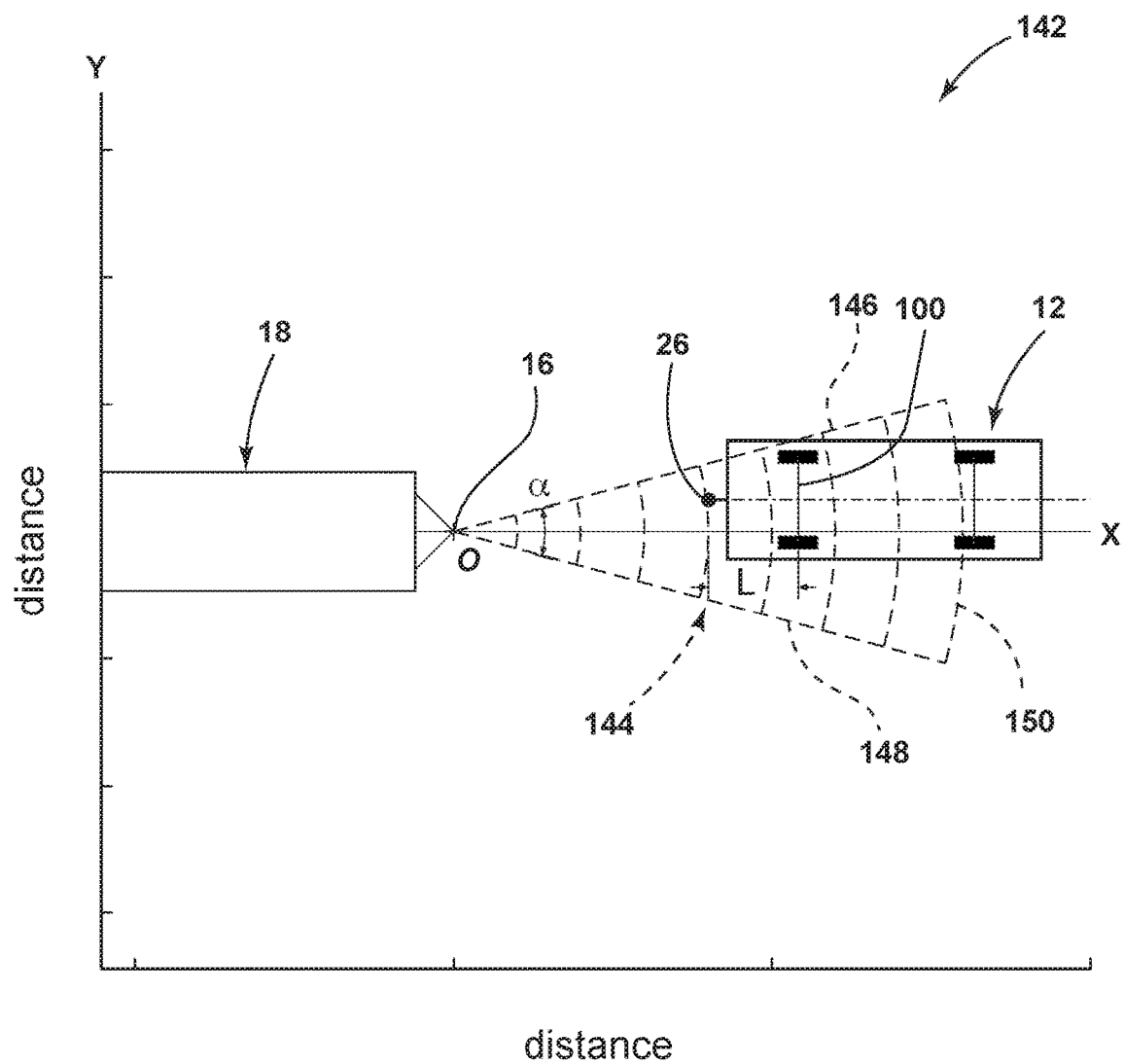
FIG. 7 is an overhead schematic view of the vehicle and the trailer positioned within a coordinate system along with a boundary area projecting from a trailer coupler of the trailer, according to some examples.

Referring to FIG. 7, the vehicle 12 and trailer 18 are shown located in a coordinate system 142. The coordinate system 142 is generated by the controller 14 to positionally relate the vehicle 12 and the trailer 18 based on information provided by the sensing system 46. As depicted, the coordinate system 142 is a localized Cartesian coordinate system having an x-axis and a y-axis. In the depicted examples, the x-axis coincides with the longitudinal axis of the trailer 18, and as such, the two terms are used interchangeably herein. The coordinate system 142 includes an origin O (x=0, y=0) set at the coupler 16 shown as coupler ball socket 34. The controller 14 also generates a boundary area shown as sector 144, which originates from the coupler ball socket 34 and projects forward therefrom. The sector 144 includes the plane enclosed by a first radius 146, a second radius 148, and an arc 150 therebetween. The size of the sector 144 is based on an angle α between the first and second radii 146, 148. The angle α is provided by:

$$α = 2\tan^{-1}\left(\frac{L}{ρ_{min}}\right), \quad (3)$$

where L is the distance from the hitch ball 26 to a rear axle 100 of the vehicle 12, and $ρ_{min}$ is a minimum turning radius of the vehicle 12. In examples where the origin O is set at the coupler 16 and the x-axis coincides with the longitudinal axis of the trailer 18, the angle of the first radius 146 with respect to the longitudinal axis of the trailer 18 is provided by:

$$ψ + \frac{α}{2}, \quad (4)$$

where ψ a heading direction of the vehicle 12 with respect to the x-axis. The angle of the second radius 148 with respect to the longitudinal axis of the trailer 18 is provided by:

$$ψ - \frac{α}{2}. \quad (5)$$

With respect to the depicted example, where the heading direction ψ of the vehicle 12 is zero degrees, the angles of both the first and second radii 146, 148 of the sector 144 are $$+\frac{α}{2} \text{ and } -\frac{α}{2},$$

respectively.

Figure 8:
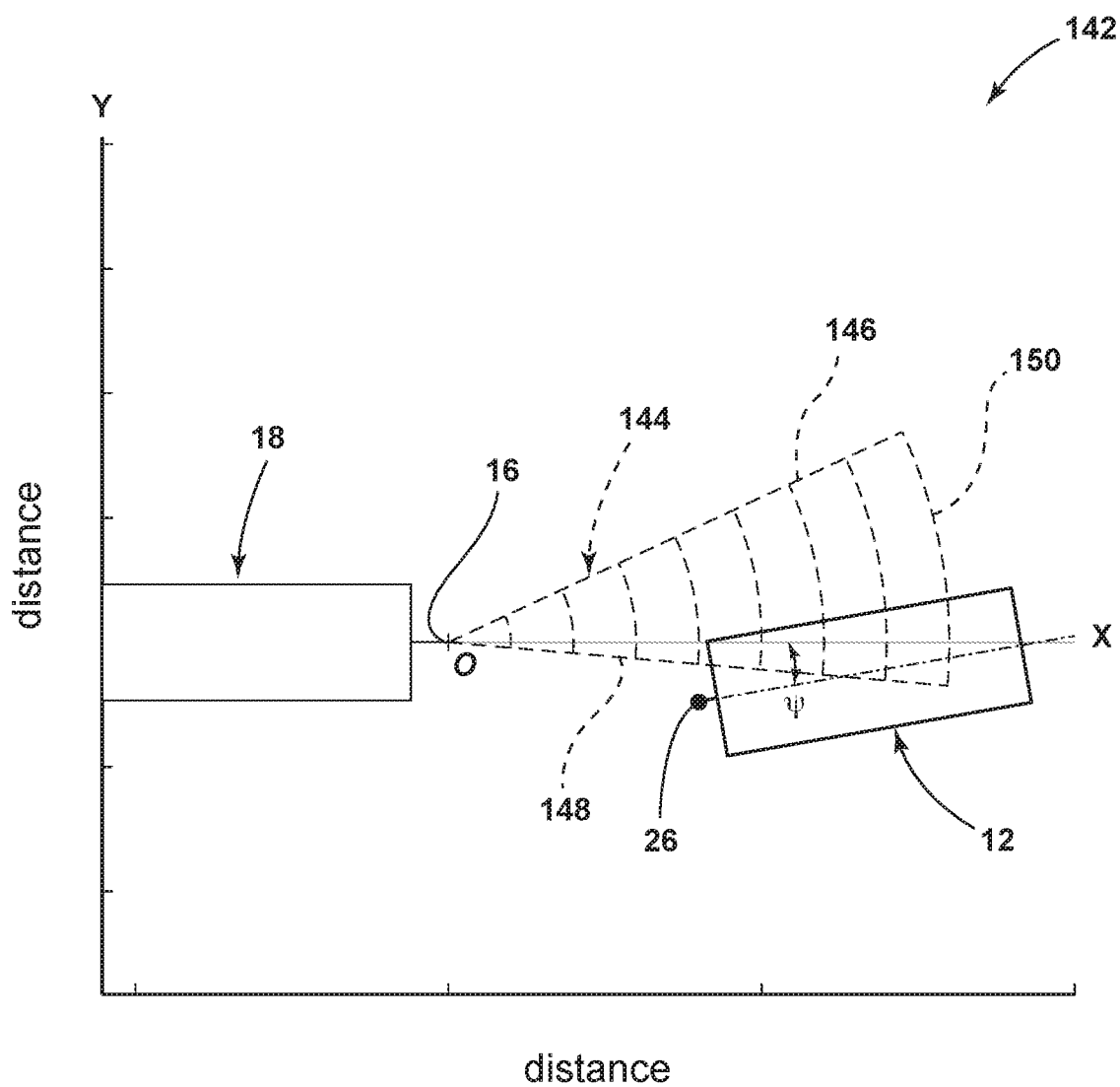
FIG. 8 is an overhead schematic view of the vehicle at a heading direction different than that shown in FIG. 7, according to some examples.

For purposes of comparison, FIG. 8 exemplarily shows the vehicle 12 at a heading direction ψ of approximately 10 degrees or $$\frac{\pi}{18}$$

radian. In this particular instance, the angles of both the first and second radii 146, 148 of the sector 144 are $$\frac{\pi}{18} + \frac{\alpha}{2} \text{ and } \frac{\pi}{18} - \frac{\pi}{2},$$

respectively. With respect to the examples described herein, the size of the sector 144 is fixed while its orientation or aim direction is dynamic. That is, the sector 144 rotates about the coupler ball socket 34 in response to changes in the heading direction ψ of the vehicle 12.

Figure 9:
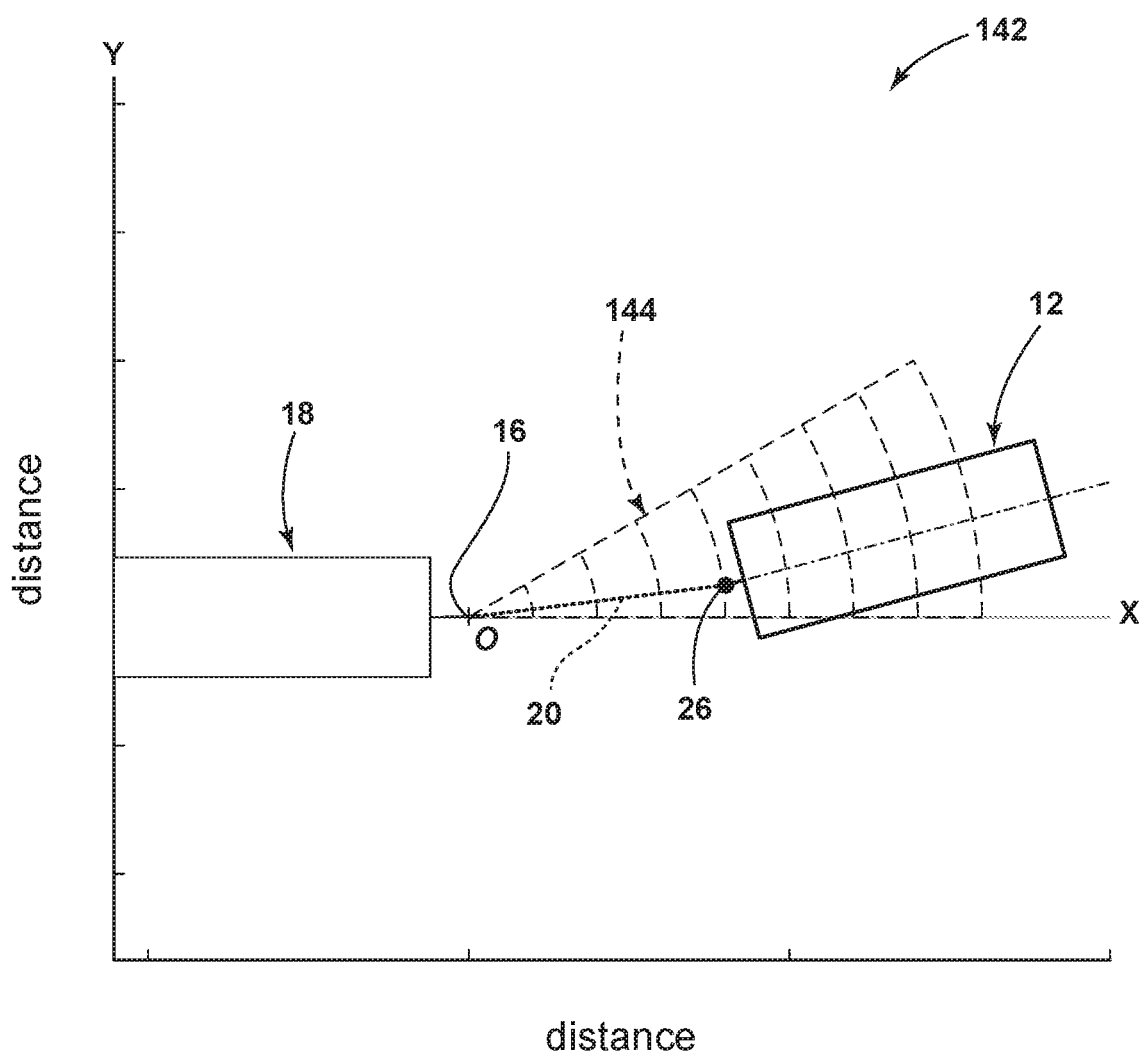
FIG. 9 is an overhead schematic view of a vehicle backup path defined by the controller.
Figure 10:
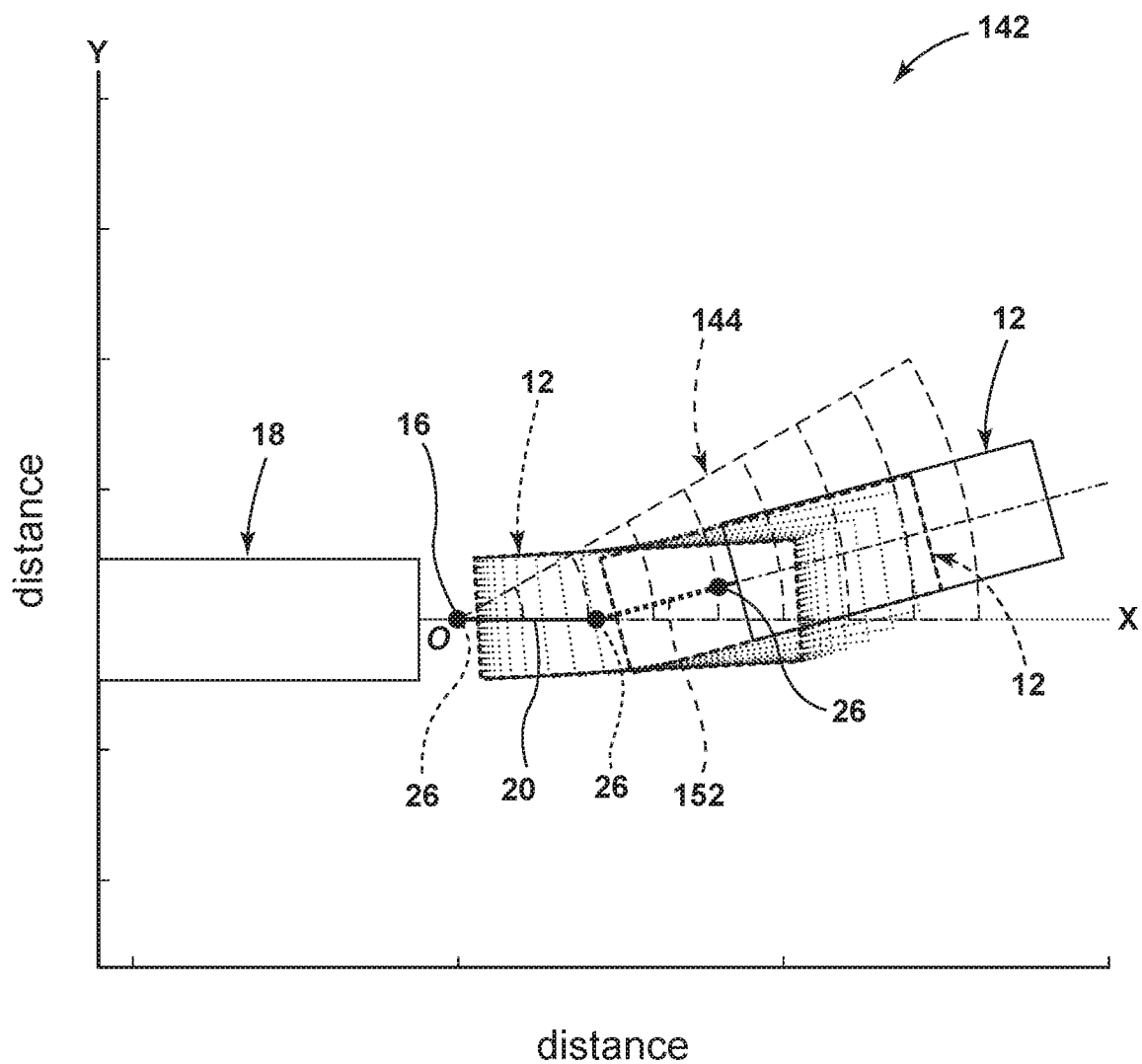
FIG. 10 is an overhead schematic view of an alternative vehicle backup path.

With reference to FIGS. 9 and 10, the controller 14 defines the vehicle backup path 20 toward the trailer 18 if the hitch ball 26 is located inside the sector 144. With respect to the examples provided herein, the vehicle backup path 20 corresponds to a trajectory of the hitch ball 26 toward the coupler ball socket 34. Once the hitch ball 26 reaches the end of its trajectory, the hitch ball 26 and coupler ball socket 34 are generally aligned to enable the trailer 18 to be hitched to the vehicle 12. As shown in FIG. 9, the vehicle backup path 20 may be straight in order to correspond to the shortest distance between the hitch ball 26 and the coupler ball socket 34. Alternatively, as shown in FIG. 10, the system 10 may first back the vehicle 12 along its current heading 152 to reduce the offset between the hitch ball 26 and the coupler ball socket 34 in the y-axis direction in an effort to better align the vehicle 12 with the trailer 18. In the depicted example, the controller 14 defines the vehicle backup path 20 once hitch ball 26 intersects with the longitudinal axis of the trailer 18. In the depicted example, the vehicle backup path 20 is a straight backup path 20 coinciding with the longitudinal axis of the trailer 18. However, it will be understood that the vehicle backup path 20 may be generated at any point along the current heading 152 of the vehicle 12 leading up to and extending past the longitudinal axis of the trailer 18, assuming the hitch ball 26 remains inside the sector 144.

Figure 11:
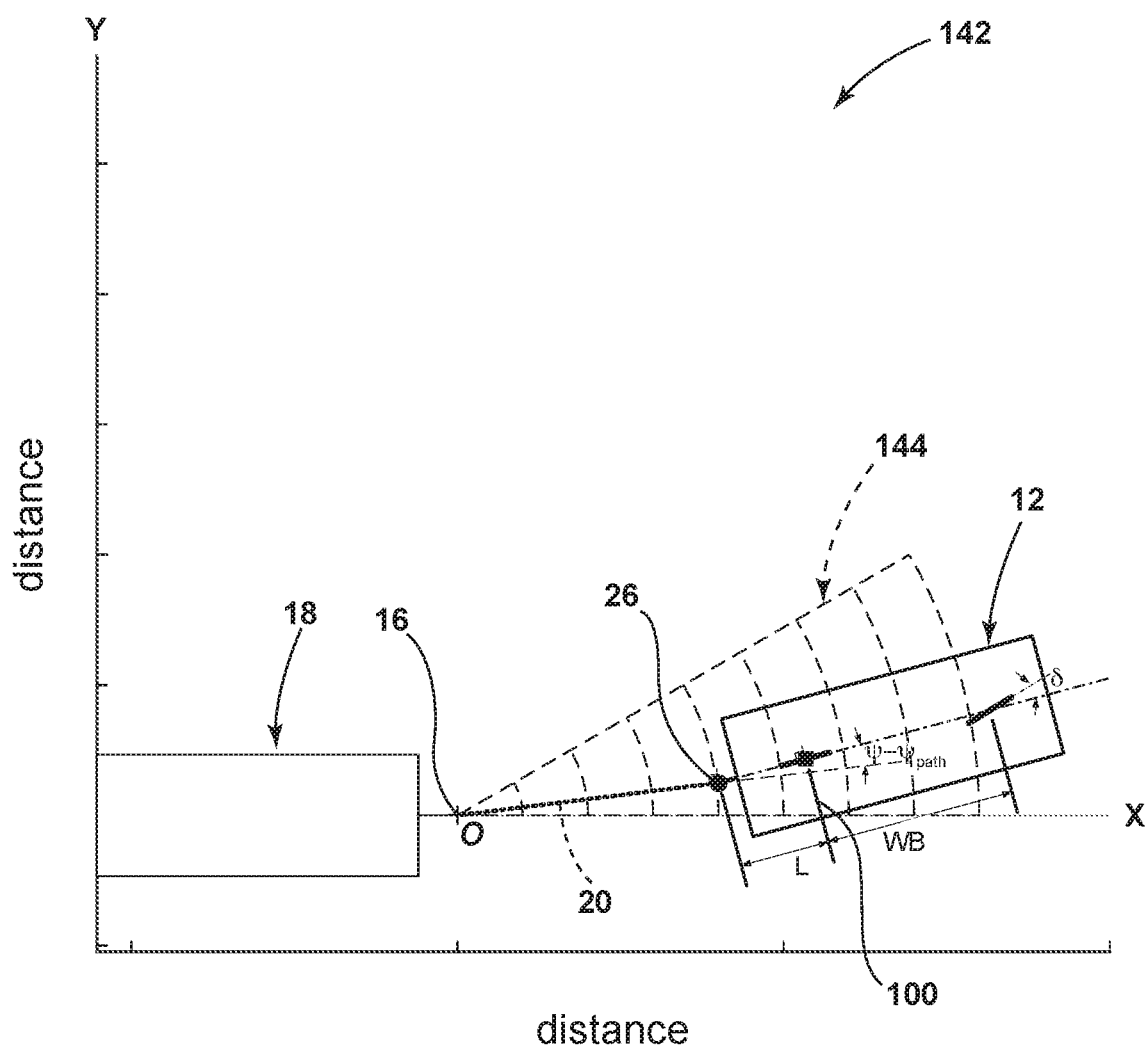
FIG. 11 illustrates kinematic variables associated with determining a steering angle of the vehicle, according to some examples.

With reference to FIG. 11, an angle $\psi_{path}$ of the vehicle backup path 20 with respect to the longitudinal axis of the trailer 18 is provided by:

$$\psi_{path} = \tan^{-1}\left(\frac{y_{hb} - y_{hs}}{x_{hb} - x_{hs}}\right), \quad (6)$$

where $x_{hb}, y_{hb}$ represent the x, y coordinates of the hitch ball 26, and $x_{hs}, y_{hs}$ represent the x, y coordinates of the coupler ball socket 34. Once the controller 14 determines the angle $\psi_{path}$ of the vehicle backup path 20, the controller 14 can determine a steering angle δ for steering the vehicle 12 along the vehicle backup path 20. The steering angle δ is provided by:

$$\delta = \tan^{-1}\left(\frac{W\tan(\psi - \psi_{path})}{L}\right) \text{ or } \delta = \tan^{-1}\left(\frac{W\tan\alpha_c}{L}\right), \quad (7)$$

where W is a wheelbase of the vehicle 12, L is the distance from the hitch ball 26 to the rear axle 100, and ψ is the heading direction of the vehicle 12 with respect to the longitudinal axis of the trailer 18. Positive and negative values of the steering angle δ denote a backing direction of the vehicle 12 such as clockwise and counterclockwise, for example. It will be understood that other sign conventions may be used if desired.

Figure 12:
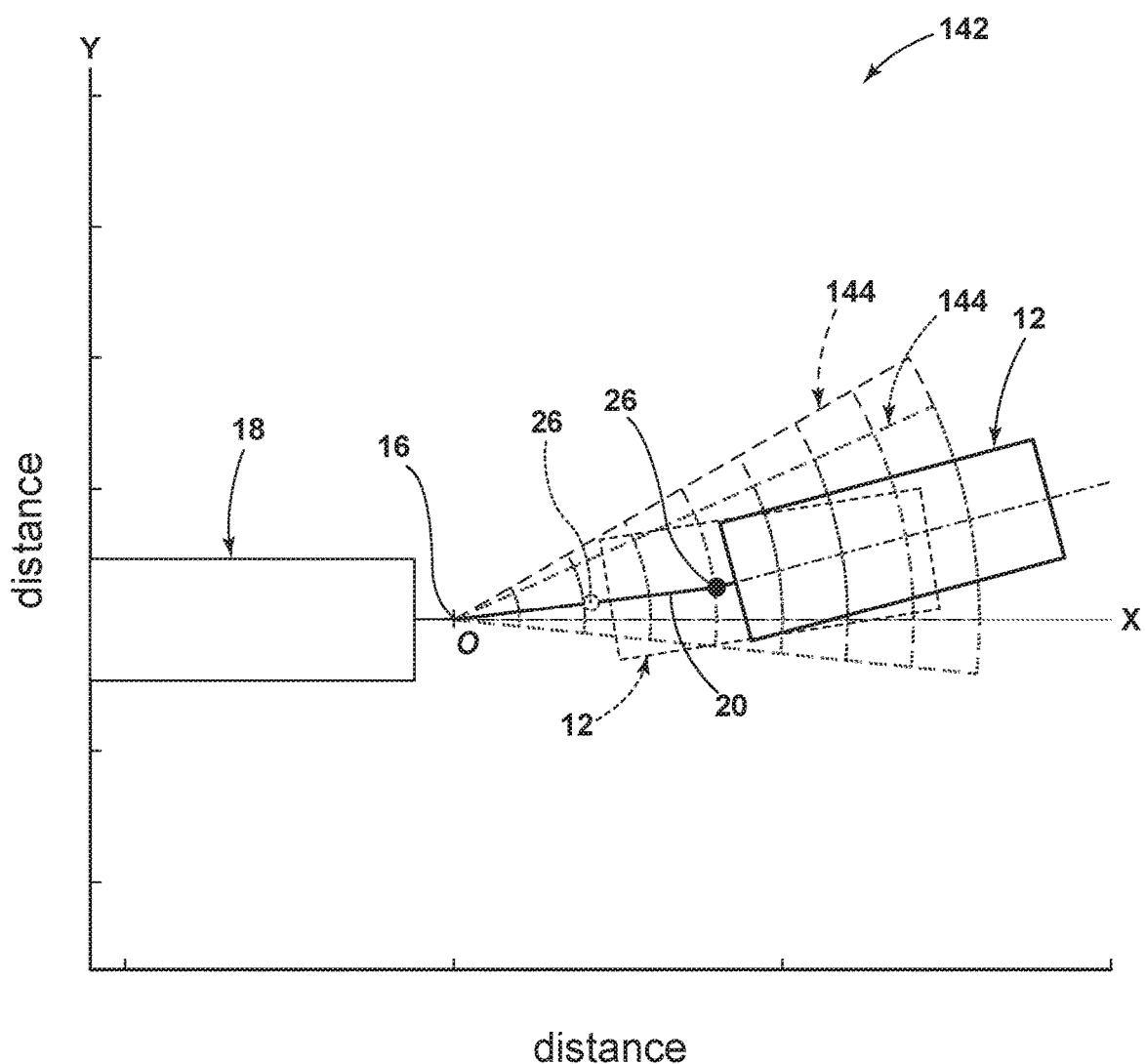
FIG. 12 illustrates the dynamic nature of the boundary area, according to some examples.

As described herein, the orientation or aim direction of the sector 144 changes in response to changes in the heading direction ψ of the vehicle 12. For example, as shown in FIG. 12, the sector 144 rotates clockwise to a new position in response to the vehicle 12 traveling from its initial position (shown in solid lines) along backup path 20 to a later position (shown in dashed lines) along the vehicle backup path 20. The dynamic aspect of the sector 144 enables the controller 14 to redefine the vehicle backup path 20 in the event of tracking errors such as incorrect coordinates being assigned to the coupler ball socket 34.

In situations where the hitch ball 26 is located outside the sector 144, the system 10 may notify the driver of the same via the vehicle notification system 106. In some examples, the controller 14 generates the coordinate system 142 (FIG. 7) on the vehicle display 118 as a visual aid to guide the driver of the vehicle 12 in making maneuvers in order to position the hitch ball 26 inside the sector 144. In other examples, the system 10 may autonomously or semi-autonomously maneuver the vehicle 12 to position the hitch ball 26 inside the sector 144. Regardless of whether the maneuvers are done manually or autonomously, it will be understood that maneuvers for positioning the hitch ball 26 inside the sector 144 include maneuvering the vehicle 12 forward, backing the vehicle 12, or a combination thereof. Under an autonomous control scheme, the controller 14 may operate the vehicle brake control system 96, powertrain control system 98, and power assist steering system 80 such that the driver need only monitor the maneuvering of the vehicle 12. In contrast, under a semi-autonomous control scheme, the controller 14 may operate only some of the foregoing components, thus requiring driver intervention. For example, the driver may be required to apply gas and brakes while the controller 14 operates the power assist steering system 80 to maneuver the vehicle 12 into the sector 144. In any event, once the hitch ball 26 is inside the sector 144, the controller 14 may generate the vehicle backup path 20 and determine the corresponding steering angle δ according to any of the examples described herein. To back the vehicle 12 along the vehicle backup path 20, it will be understood that the system 10 may assume autonomous or semi-autonomous control of the vehicle 12. Alternatively, the driver may back the vehicle 12 along the vehicle backup path 20 using the coordinate system 142 and sector 144 generated on the vehicle display 118, if provided.

Figure 13:
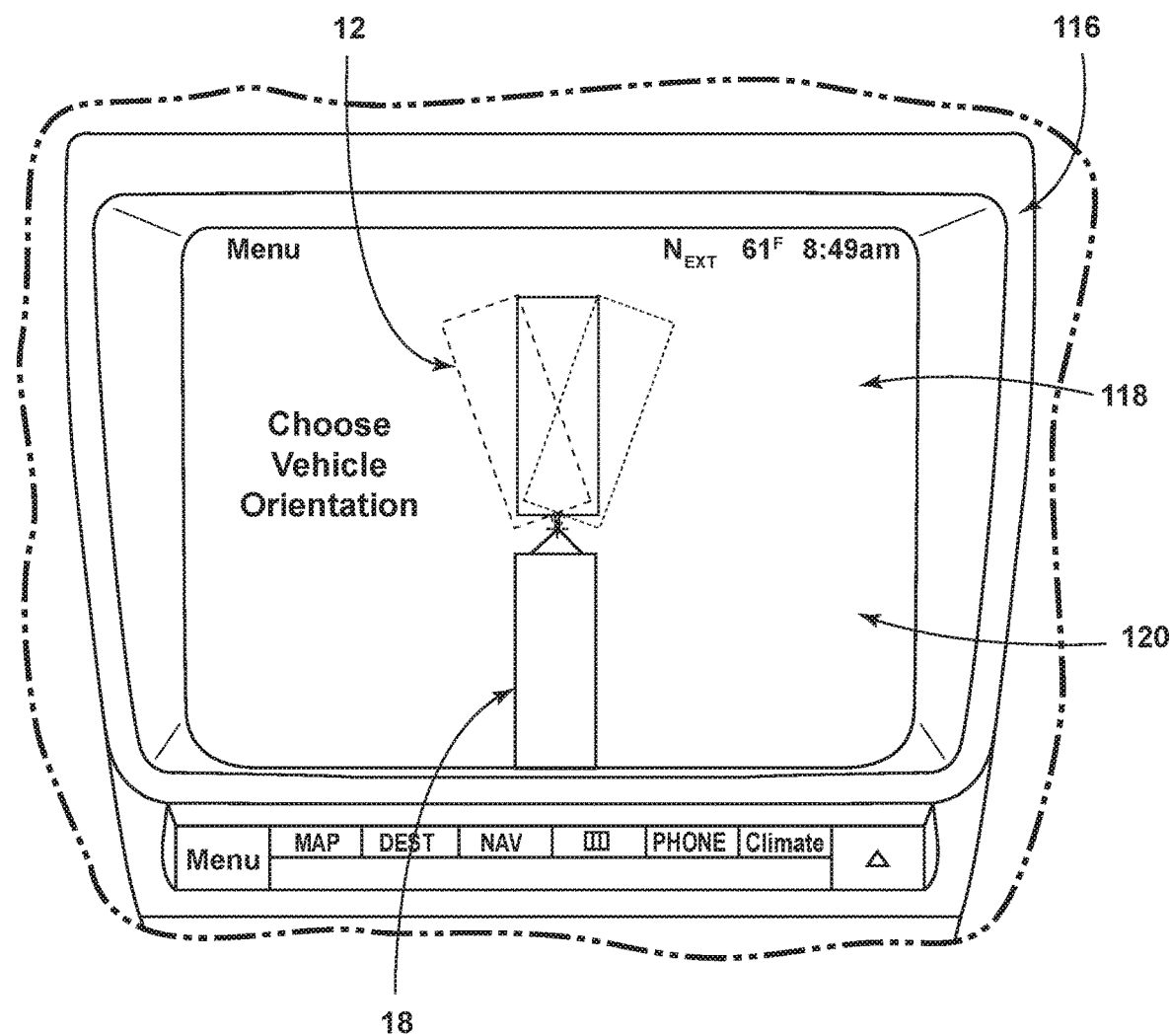
FIG. 13 is exemplary display disposed within a vehicle illustrating various vehicle orientations while aligning the hitch assembly with the coupler, according to some examples.
Figure 14:
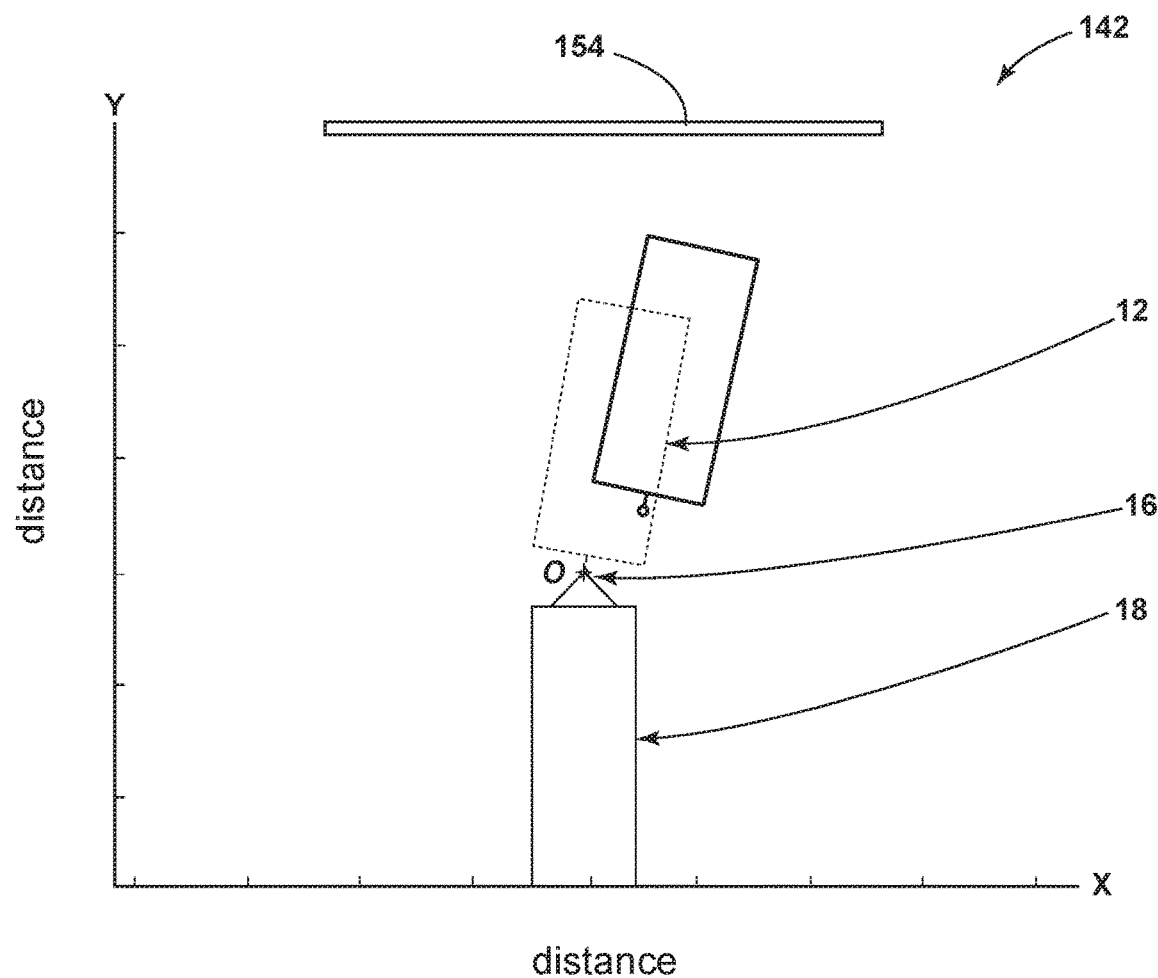
FIG. 14 is an overhead schematic view of a vehicle moving towards the trailer while maintaining a common heading direction, according to some examples.
Figure 15:
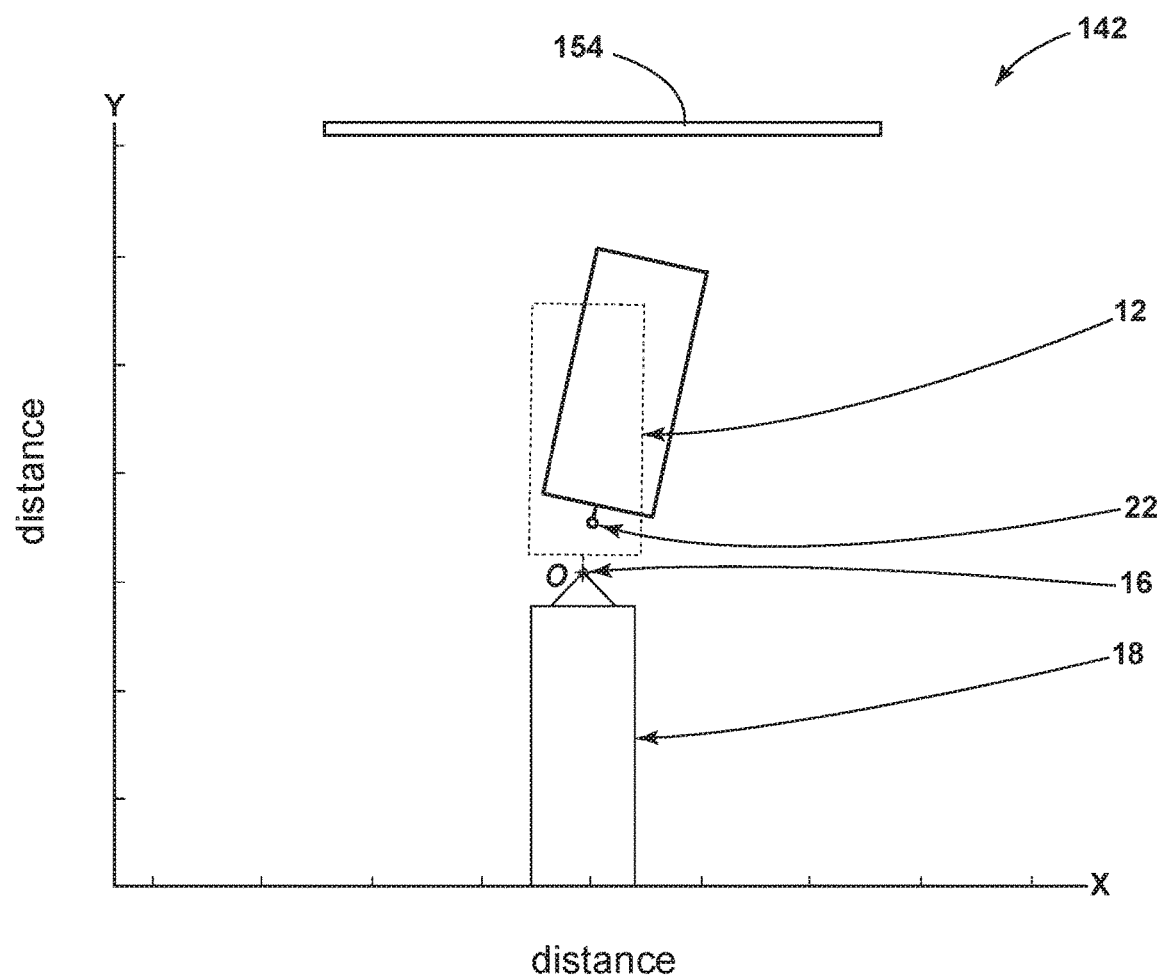
FIG. 15 is an overhead schematic view of a vehicle approaching the trailer while avoiding forwardly disposed obstacles, according to some examples.
Figure 16:
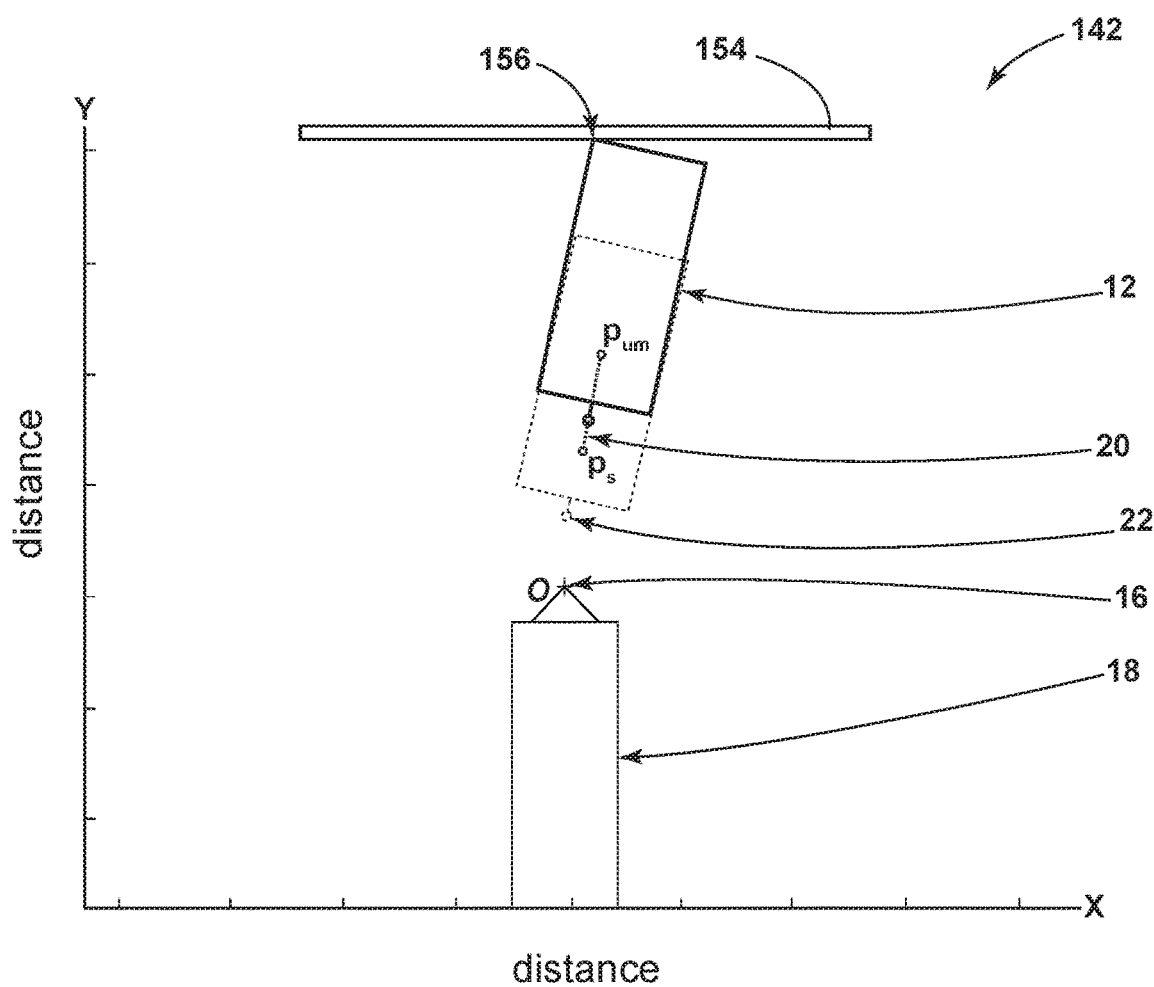
FIG. 16 is an overhead schematic view of the vehicle disposed proximately to the forwardly disposed obstacle, according to some examples.

Referring to FIG. 13, in some instances, the vehicle may provide a user U of the hitch assist system 10 with an opportunity to choose the vehicle heading direction ψ when the hitch ball is aligned with the coupler 16 to avoid one or more obstacles 154 (FIG. 14) disposed proximately to the vehicle 12 and/or the trailer 18. In such instances, the display within the vehicle and/or incorporated within any electronic device may illustrate various vehicle heading directions ψ for the user U to choose from and/or a user U may input a desired orientation. Or, alternatively, the starting heading direction ψ of the vehicle when the hitch assist system 10 is initiated, and/or an angle at any other time during use of the hitch assist system 10, may be chosen as a default preferred vehicle heading direction ψ (FIG. 14). In such instances, the display within the vehicle and/or incorporated within any electronic device may illustrate/animate that the preferred vehicle heading direction follows the actual vehicle heading direction as the user U positions the vehicle prior to initiate or during the use of the hitch assist system 10.

Referring to FIGS. 14-17, once a preferred vehicle heading direction ψ is determined, the vehicle path 20 is determined while avoiding obstacles 154. To determine the vehicle path 20, while avoiding any proximate obstacles 154, the hitch assist system 10 may determine an uppermost position $p_{um}$ between a forward portion 156 of the vehicle 12 and any obstacles 154 with the vehicle starting heading direction ψ. The uppermost position $p_{um}$ may be the farthest position of the vehicle 12 from the trailer 18. It will be appreciated that the uppermost position $p_{um}$ may be calculated as the greatest distance the vehicle can move forwardly of its initial position prior to contacting any obstacle 154. For example, as exemplarily shown in FIG. 16, the front left corner portion 156 of the vehicle would be the first portion of the vehicle to contact the obstacle 154. Therefore, the uppermost position $p_{um}$ ($x_{um}$, $y_{um}$, ψ$_s$) of the front left corner of the vehicle may be calculated by the following equations:

$$y_{um} = y_{obs} - L_f \sin \psi_s - 0.5 V_w \cos \psi_s, \text{ and} \quad (8)$$

$$x_{um} = x_s + (y_{um} - y_s)/\tan \phi_s, \quad (9)$$

where $L_f$ is the distance from the vehicle's rear axle to the forward portion 156 of the vehicle 12, $V_w$ is the vehicle's width, $x_s$ is the starting position of the vehicle 12 in the x-direction, and $y_s$ is the starting position of the vehicle 12 in the y-direction, ψ$_s$ is the starting heading direction of the vehicle 12, and $y_{obs}$ is the position of the obstacle 154 in the y-direction.

Figure 17:
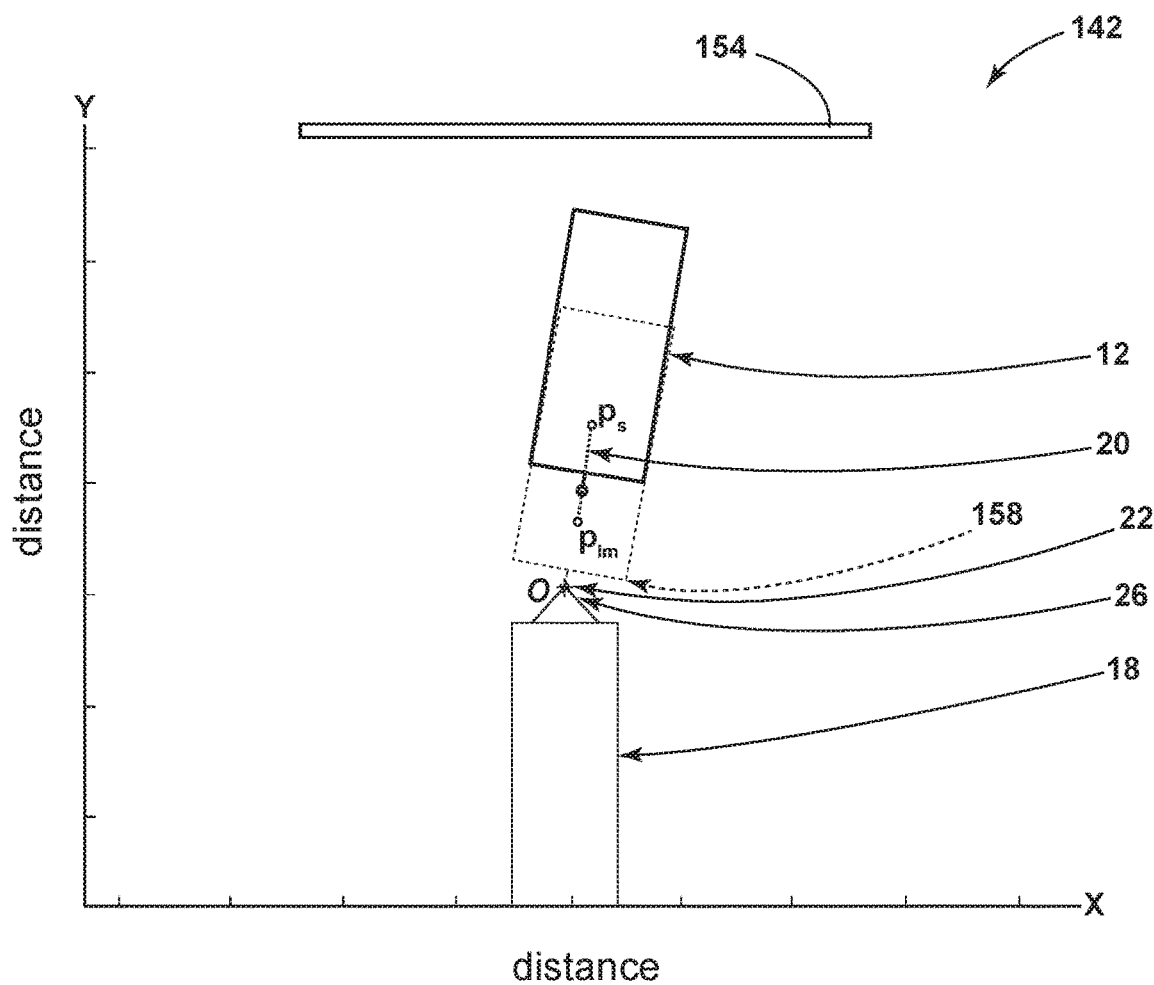
FIG. 17 is an overhead schematic view of the vehicle disposed proximately to the trailer, according to some examples.
Figure 18:
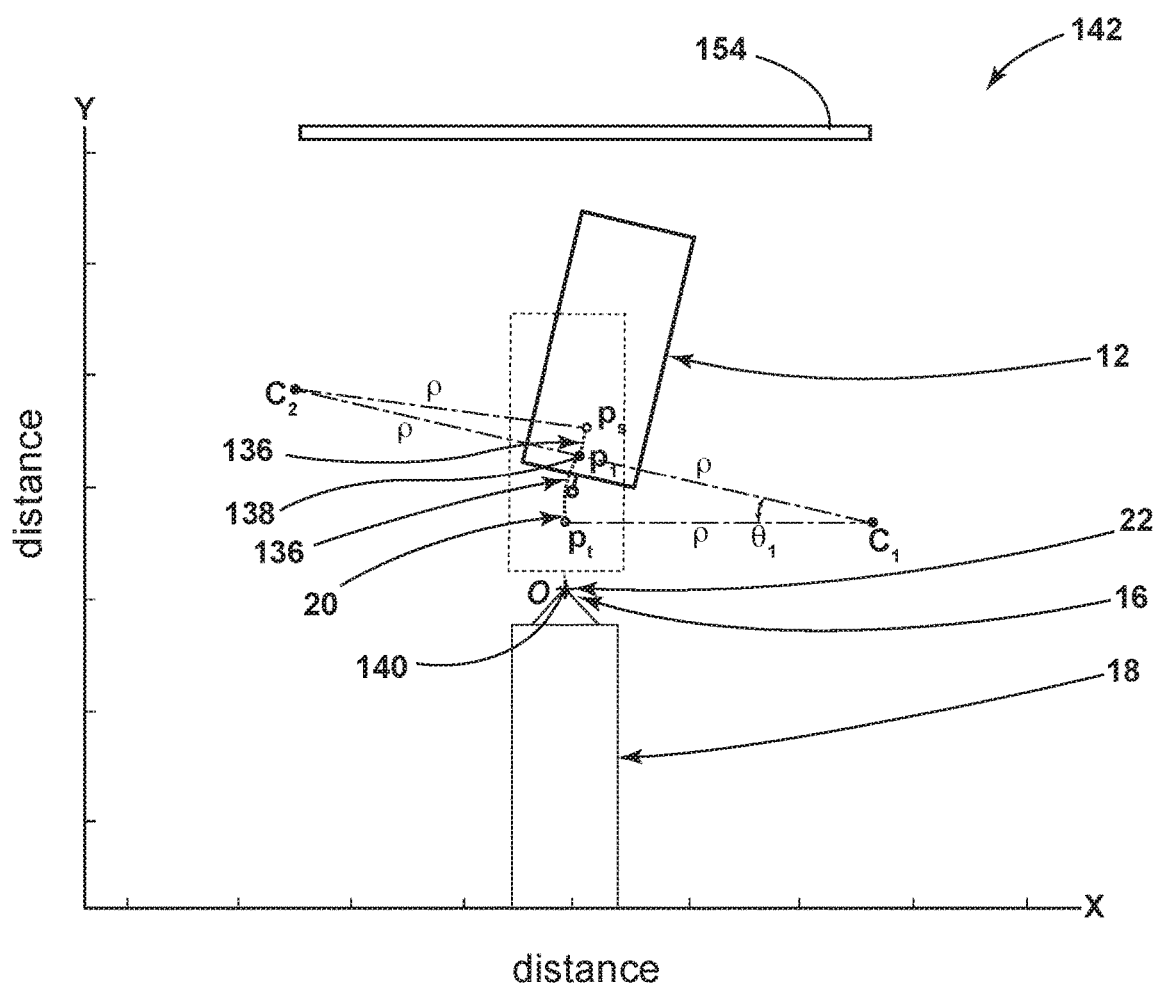
FIG. 18 is an overhead schematic view of an exemplary view path, according to some examples.

Similarly, from the current vehicle position $p_s$, the hitch assist system 10 may determine a lowermost position $p_{lm}$ between a rear portion 158 of the vehicle 12 and any obstacles 154 and/or the trailer 18 with the vehicle starting heading direction ψ, as exemplarily illustrated in FIG. 17. The lowermost position $p_{lm}$ ($x_{lm}$, $y_{lm}$, ψ$_s$) of the vehicle 12 may be calculated by the following equations:

$$y_{lm} = L_r \sin \psi_s + 0.5 V_w \cos \psi_s, \text{ and} \quad (10)$$

$$x_{lm} = x_s + (y_{lm} - y_s)/\tan \phi_s. \quad (11)$$

where $L_r$ is the distance from the vehicle's rear axle to the rear portion 158 of the vehicle 12. The lowermost position $p_{lm}$ may be the nearest position of the vehicle 12 from the trailer 18. Referring now to FIG. 18, as provided herein, the initial positioning of the trailer 18 relative to the vehicle 12 may be such that forward movement of vehicle 12 is needed for the desired vehicle path 20, such as when the trailer 18 is latitudinally offset to the side of vehicle 12. In this manner, the path 20 may include various segments 136 of forward driving and/or rearward driving of the vehicle 12 separated by inflection points 138 at which the vehicle 12 transitions between forward and rearward movement. In some examples, the path 20 can include one or more segments 136 that collectively traverse the lateral movement of the vehicle 12, while providing a segment 136 of straight rearward backing to bring the hitch ball 26 into an offset position 134 of the coupler 16. In some instances, the path 20 can include one or more segments 136 that collectively traverse the lateral movement of the vehicle 12 through one or more "S-turns," which may be defined as a segment 136 that is performed with the steering angle δ offset from neutral in a first direction and a subsequent segment 136 that is performed with a steering angle δ that is offset from neutral in a second, opposing direction.

Referring now to FIG. 18, as provided herein, to determine the vehicle path 20, the hitch assist system 10 may calculate any number of segments that move the vehicle from the initial position to a target final position. In some instances, a determination of whether a path 20 is feasible is determined for alignment of the hitch ball 26 and the coupler 16 with a predefined vehicle heading direction ψ. In such instances, each segment is calculated based on a center point $C_1$, $C_2$ of the turning radius of each segment. For example, the segments can each be calculated by first determining the center points $C_1$, $C_2$ of each nonlinear segment. Accordingly, from the target position, $p_t$ ($x_t$, $y_t$, ψ$_t$), the x- and y-coordinates of the first center of rotation $c_1$ is calculated by the following equations:

$$x_{c1} = x_t + \rho \sin \psi_t, \text{ and} \quad (12)$$

$$y_{c1} = y_t - \rho \sin \psi_t, \quad (13)$$

where ρ is the turning radius of the vehicle 12 during each segment. From the start position $p_s$ ($x_s$, $y_s$, ψ$_s$), the x- and y-coordinates of the first center of rotation $c_2$ is calculated by the following equations:

$$x_{c2} = x_s - \rho \sin \psi_s, \text{ and} \quad (14)$$

$$y_{c2} = y_s + \rho \sin \psi_s. \quad (15)$$

Since the first segment and the second segment intersect at a common point, which is the inflection point, the following equation can be used to determine that point:

$$(x_{c1} - x_{c2})^2 + (y_{c1} - y_{c2})^2 = (2\rho)^2. \quad (16)$$

Substituting $x_{c1}$, $y_{c1}$, $x_{c2}$ from the above equations and solving the resulting equation, radius p may be calculated. Then, the x- and y-coordinates of inflection point $p_1$, where the two segments intersect can be solved by the following equations:

$$x_{p1} = \frac{(x_{c1} + x_{c2})}{2}, \text{ and} \quad (17)$$

$$y_{p1} = \frac{(y_{c1} + y_{c2})}{2}. \quad (18)$$

In addition, the heading direction ψ of the vehicle 12 at the first inflection point $p_1$ may be calculated by the following equation:

$$\psi_{p1} = \psi_t - \theta_1, \quad (19)$$

where $\theta_1$ is the angle of rotation of the corresponding first segment, which can be calculated by applying the law of cosines since the length of each portion of the triangle $c_1 p_i p_t$ is known. If the radius ρ is greater than or equal to the minimum turning radius $\rho_{min}$ of the vehicle 12, then a feasible path 20 is determined and the operating routine 130 may continue to guide the vehicle 12 until the hitch ball 26 is in the desired final endpoint 140 relative to the coupler 16 for the coupler 16 to engage with the hitch ball 26 when the coupler 16 is lowered into alignment and/or engagement therewith.

Figure 19:
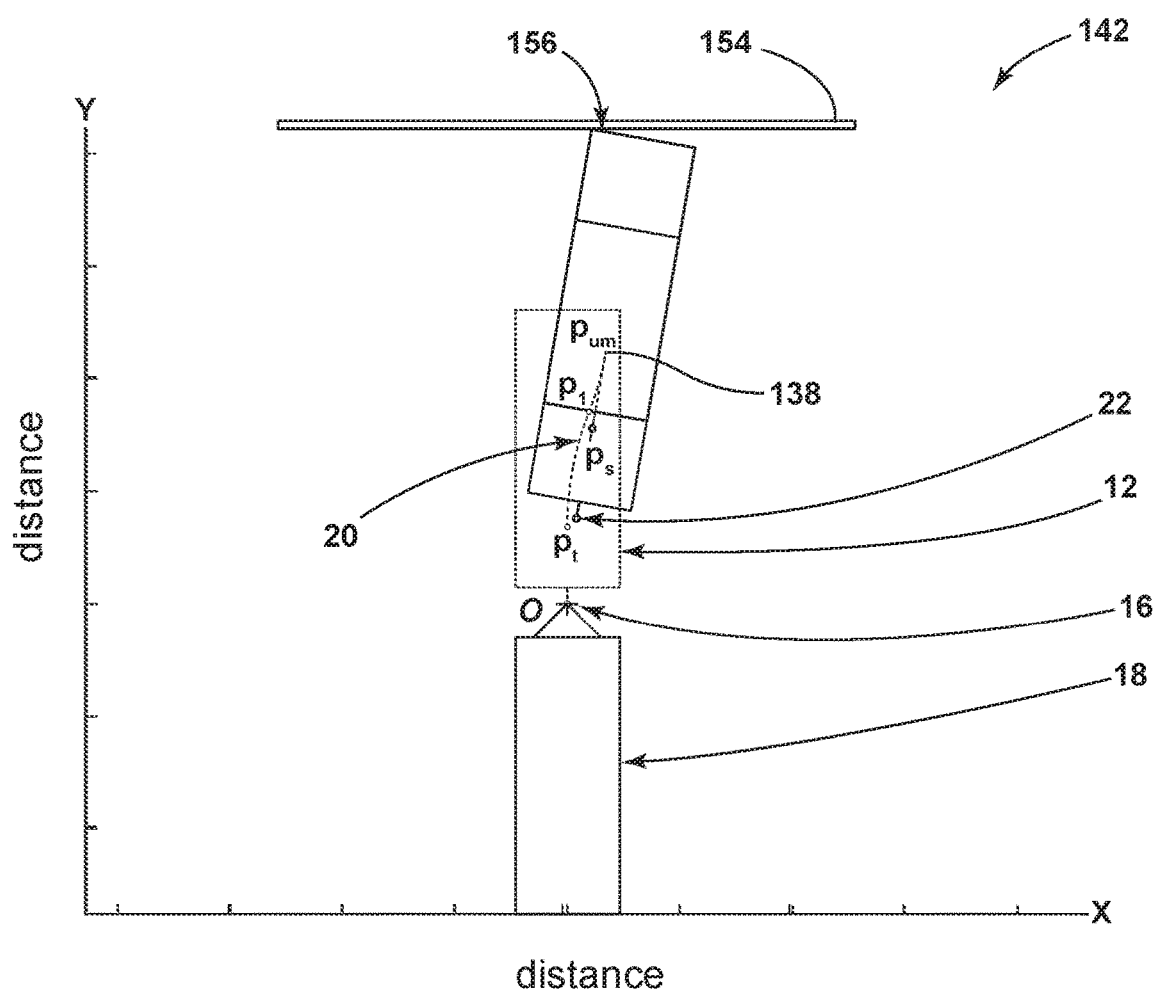
FIG. 19 is an overhead schematic view of the vehicle during a subsequent step of the alignment sequence with the trailer, according to some examples.

Referring to FIG. 19, if the radius ρ is less than the minimum turning radius $\rho_{min}$ of the vehicle 12, the hitch assist system 10 may determine whether one or more segments, which may form an S-turn can be found to move the vehicle 12 from the target position $p_t$ to the maximum forward position $p_{um}$ obtained by the methods described herein. The method for finding the center point $C_1$, $C_2$ of each segment of the S-turn, turning radius ρ, and inflection point $p_2$ may be calculated similarly to that discussed above in equations 12-19. If a valid S-turn is found, wherein the radius $\rho$ is greater than or equal to the minimum turning radius $\rho_{min}$ of the vehicle 12, then the vehicle path 20 may be determined since the path 20 from the uppermost position $p_{um}$ to the starting point $p_s$ is a straight move.

Figure 20:
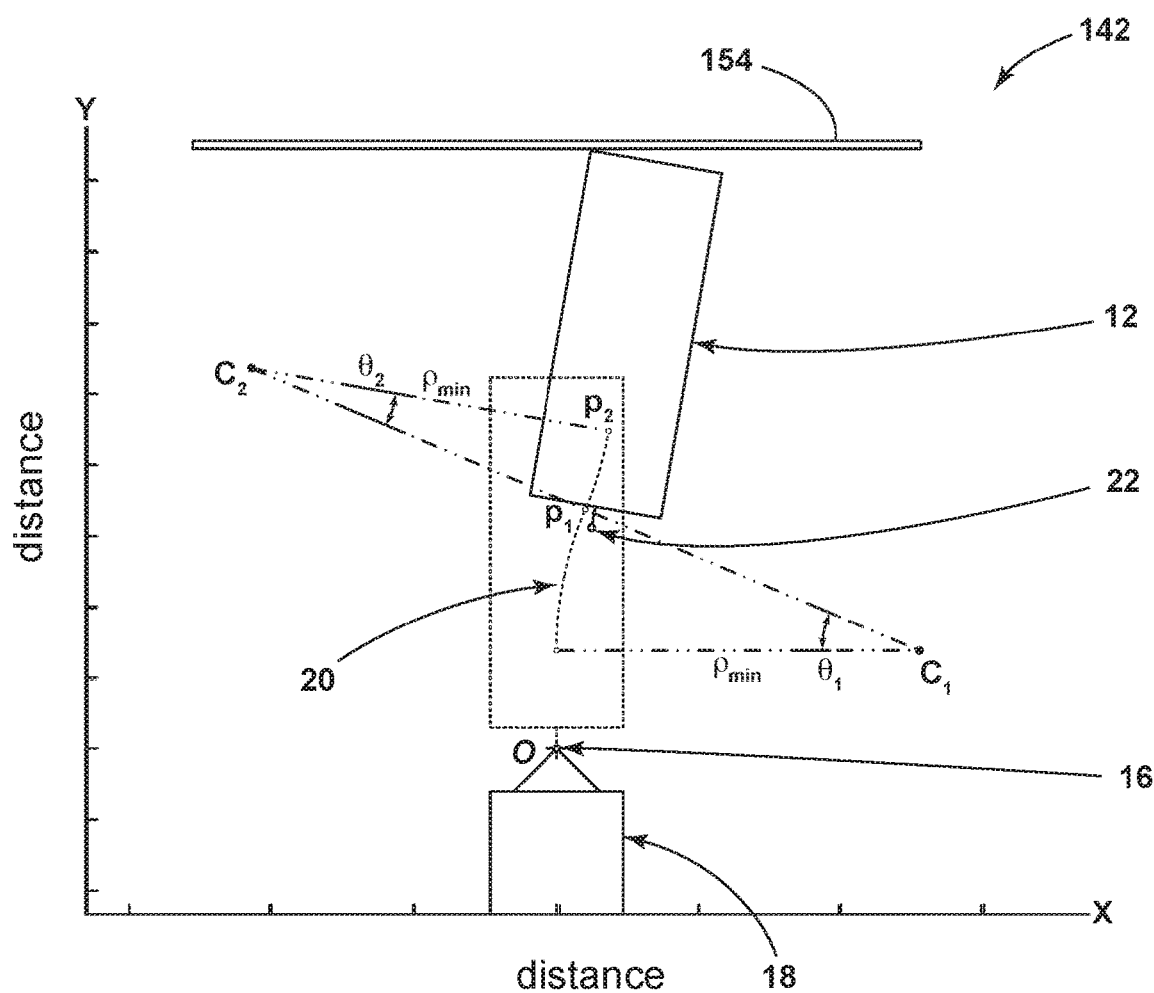
FIG. 20 is an overhead schematic view of the vehicle during a subsequent step of the alignment sequence with the trailer, according to some examples.

Referring to FIG. 20, if the radius $\rho$ is less than the minimum turning radius $\rho_{min}$ of the vehicle 12, the hitch assist system 10 may determine whether one or more segments which may form any number of S-turns may be utilized to move the vehicle 12 from its current position to the forwardly and/or rearwardly disposed obstacles 154. In some instances, at such a point, the turn radius $\rho$ may be predefined as the minimum turning radius $\rho_{min}$. For example, as exemplarily illustrated in FIG. 20, the S-turn segment centers, turning radius $\rho$, and inflection point may be calculated through the following equations:

$$x_{c1} = x_t + \rho_{min}\sin\psi_t, \qquad (20)$$

$$y_{c1} = y_t - \rho_{min}\cos\psi_t, \qquad (21)$$

$$y_{c2} = y_{um} + \rho_{min}\cos\psi_s, \qquad (22)$$

$$x_{c2} = x_{c1} - \sqrt{(2\rho_{min})^2 - (y_{c1} - y_{c2})^2}, \qquad (23)$$

$$x_{p1} = \frac{(x_{c1} + x_{c2})}{2}, \qquad (24)$$

$$y_{p1} = \frac{(y_{c1} + y_{c2})}{2}, \qquad (25)$$

$$\psi_{p1} = \psi_t - \theta_1, \qquad (26)$$

$$\psi_{p2} = \psi_s, \qquad (27)$$

$$x_{p2} = (x_{p1} - x_{c2})\cos(\psi_{p2} - \psi_{p1}) - (y_{p1} - y_{c2})\sin(\psi_{p2} - \psi_{p1}) + x_{c2}, \qquad (28)$$

and $$y_{p2} = (x_{p1} - x_{c2})\sin(\psi_{p2} - \psi_{p1}) + (y_{p1} - y_{c2})\cos(\psi_{p2} - \psi_{p1}) + y_{c2}. \qquad (29)$$

Figure 21:
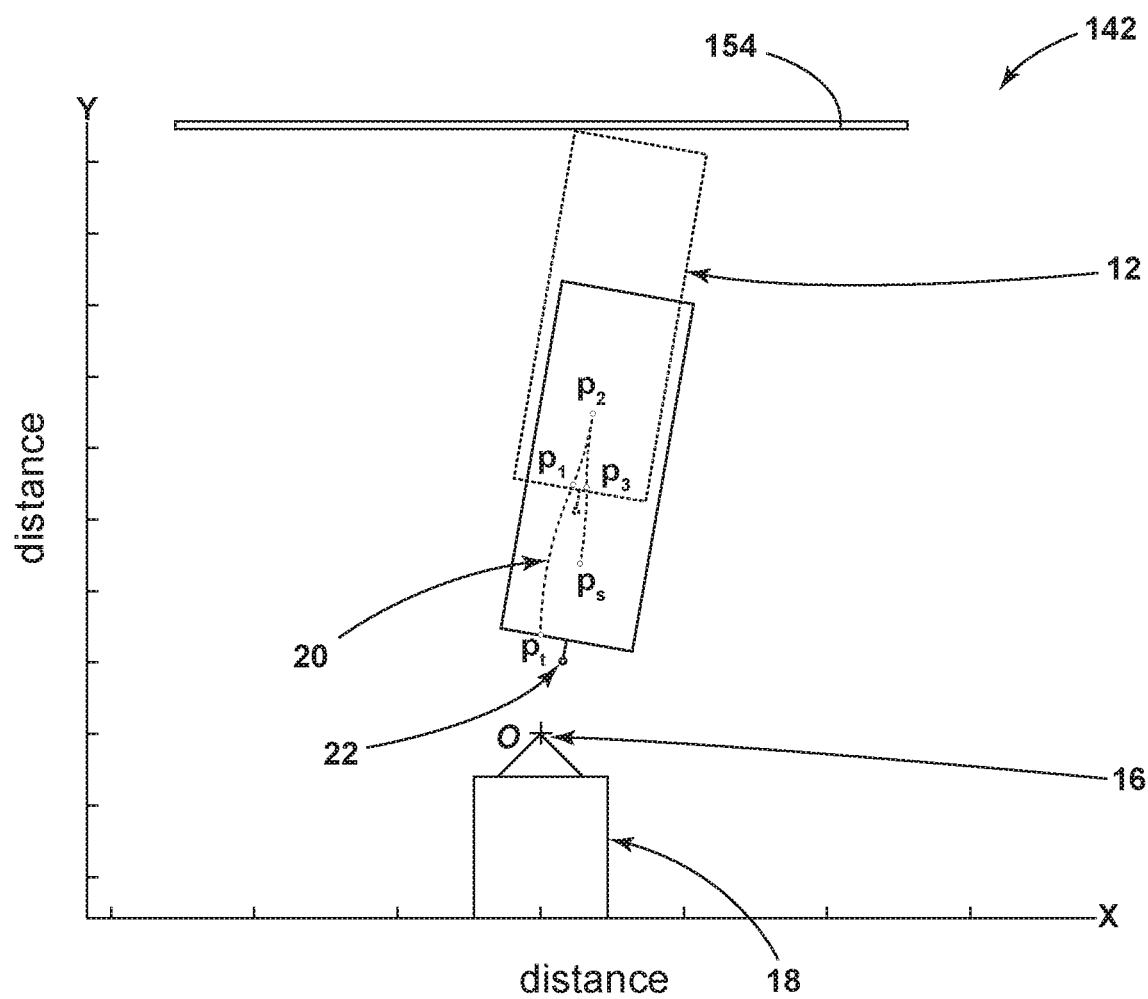
FIG. 21 is an overhead schematic view of the vehicle during a subsequent step of the alignment sequence with the trailer, according to some examples.

Referring to FIG. 21, the hitch assist system 10 may determine whether an S-turn segment can be found to move the vehicle 12 from the second inflection point to the starting position $p_s$. The method for determining the center points $C_1$, $C_2$ of the S-turns, turning radius, and inflection point $p_3$ may be found using the methods provided herein. As previously described, if a valid S-turn is found, wherein the radius $\rho$ is greater than or equal to the minimum turning radius of the vehicle $\rho_{min}$, then the vehicle path 20 may be determined.

Figure 22:
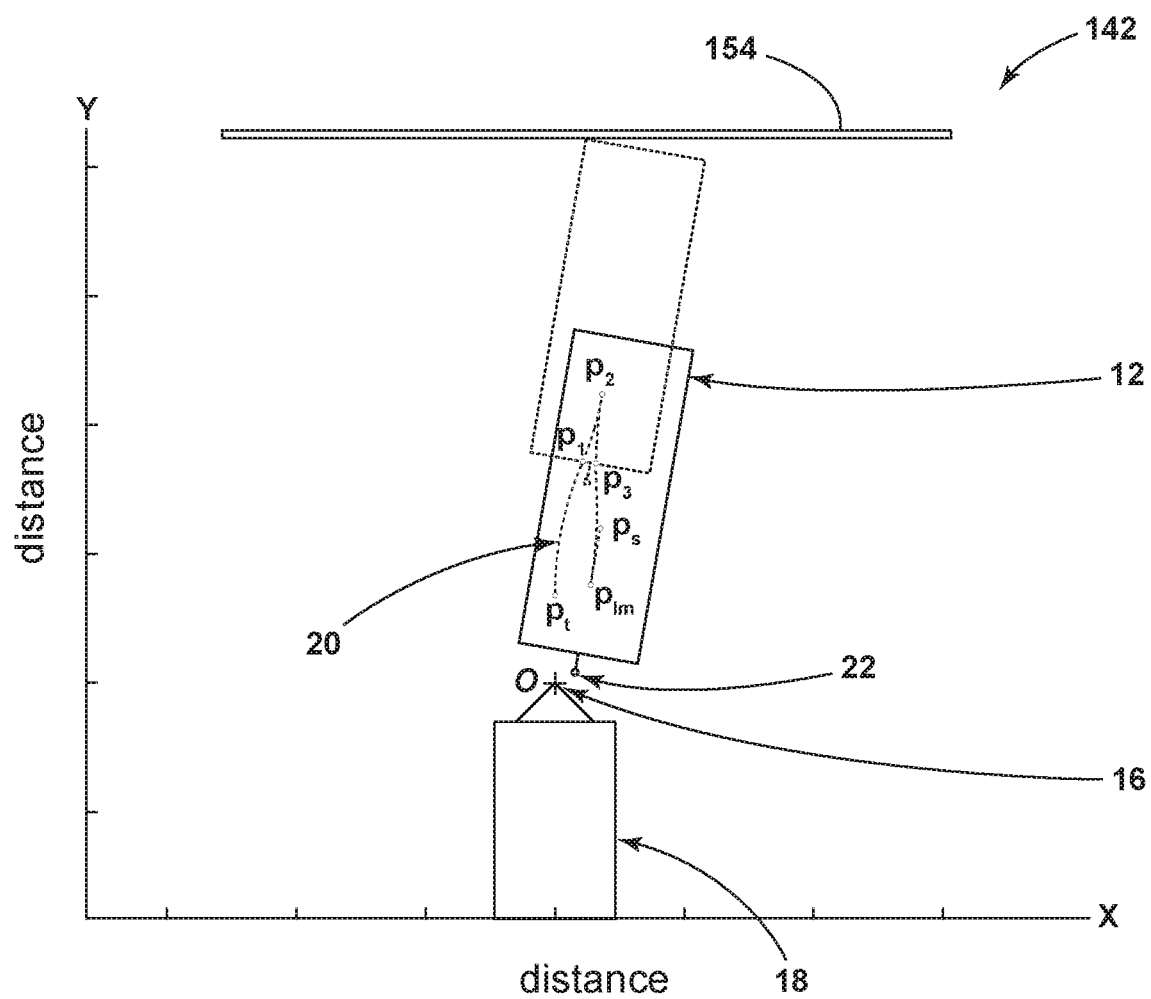
FIG. 22 is an overhead schematic view of the vehicle during a subsequent step of the alignment sequence with the trailer, according to some examples.

Referring to FIG. 22, if the radius $\rho$ is less than the minimum turning radius $\rho_{min}$ of the vehicle 12, the hitch assist system 10 may determine if additional segments may move the vehicle 12 from a current position $p_2$ to the maximum rearward position $p_{lm}$, which was determined in equations 10 and 11. The method for determining the additional segments may be the same as other segments discussed above. If a valid S-turn is found, wherein the radius $\rho$ is greater than or equal to the minimum turning radius $\rho_{min}$ of the vehicle 12, then the vehicle path 20 may be determined since the path 20 from the lowermost position $p_{lm}$ to the starting point $p_s$ is a straight move.

Figure 23:
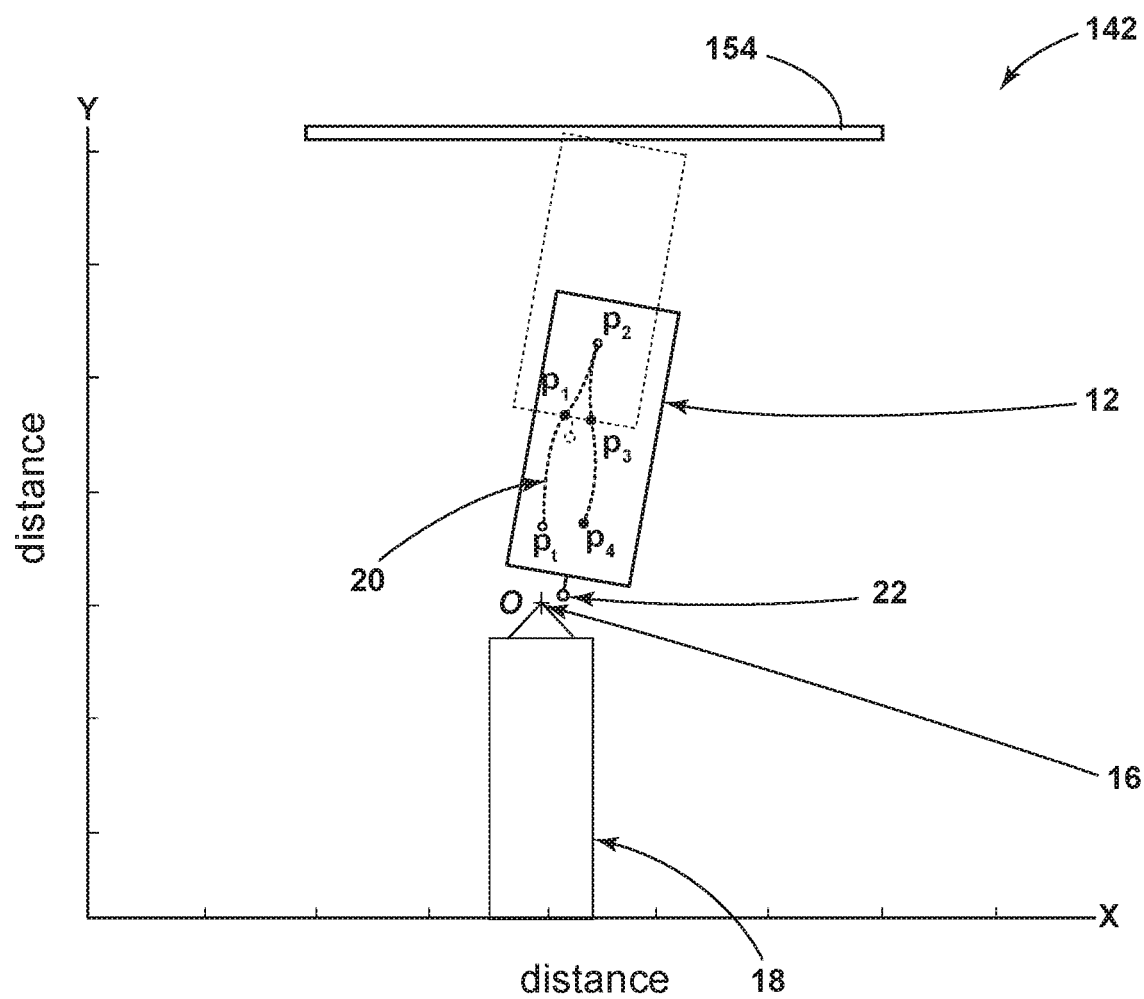
FIG. 23 is an overhead schematic view of the vehicle during a subsequent step of the alignment sequence with the trailer, according to some examples.

Referring to FIG. 23, if the radius $\rho$ is less than the minimum turning radius $\rho_{min}$ of the vehicle 12, the hitch assist system 10 may determine if additional segments may move the vehicle 12 from a current position $p_2$ to the maximum rearward position $p_4$, and the vehicle 12 is oriented along the initial vehicle heading direction $\psi$. The segment moving the vehicle 12 from the current position $p_2$ to the end of the next segment $p_4$ is similar to the movement along the segment between $p_t$ and $p_2$, except that the vehicle 12 is moving towards the trailer 18. This method can be repeated to move the vehicle 12 longitudinally and/or laterally such that a final segment may be straight with the vehicle 12 aligned in the predefined heading direction $\psi$.

Once a vehicle path 20 has been calculated, the operating routine may perform each of the segments in the reverse order of the calculation to move the vehicle towards the trailer 18 since the segments were calculated from the final endpoint back towards the vehicle's current position. In some instances, the hitch assist system 10 may determine that with any number of segments and/or a predetermined maximum number of segments, alignment with the predefined vehicle heading direction $\psi$ may not be feasible.

Figure 24:
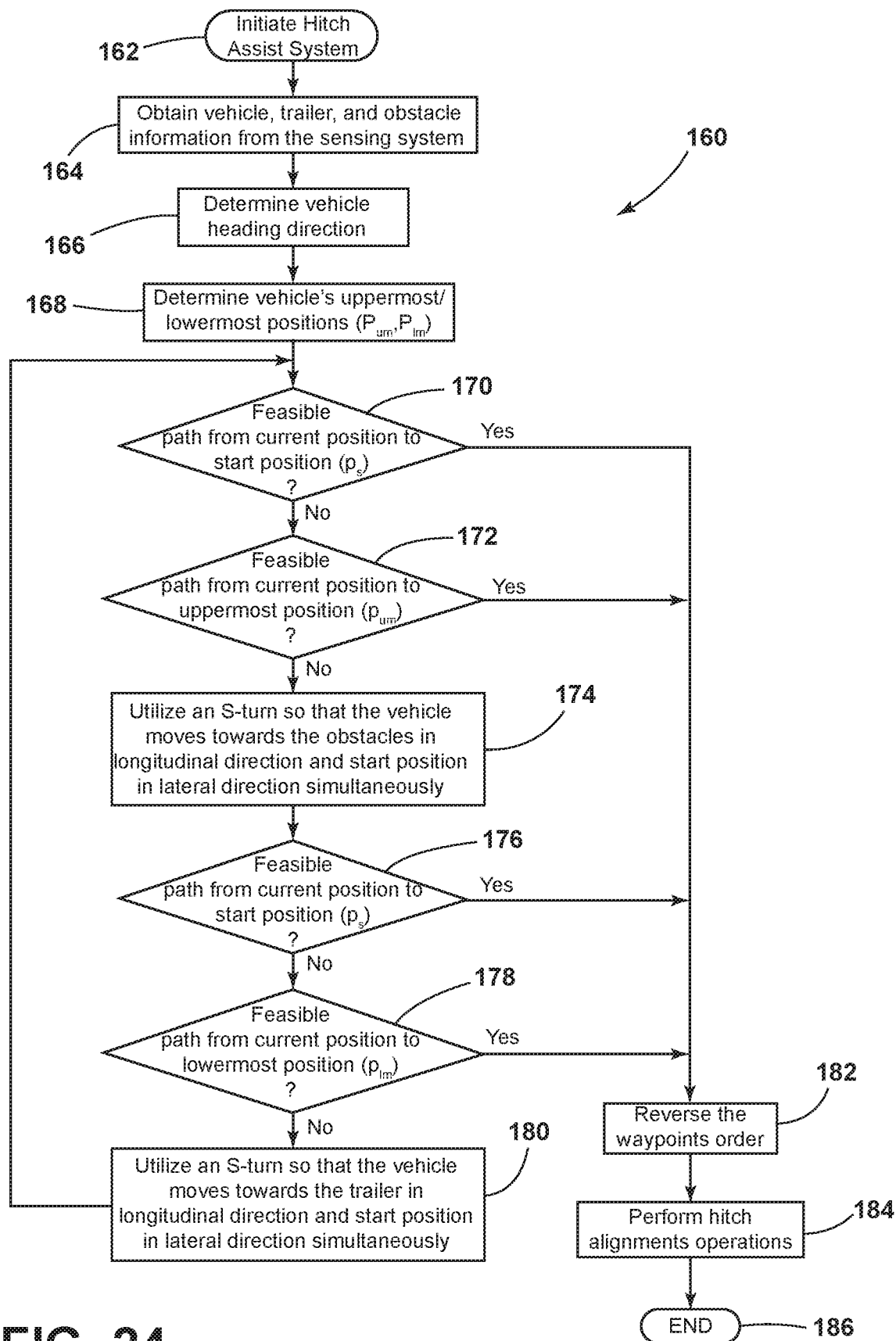
FIG. 24 is a flowchart of an operating routine of the hitch assist system, according to some examples.

Referring to FIG. 24, a method 160 of aligning the hitch assembly 22 with the coupler 16 is shown, according to some examples. In particular, at step 162, the hitch assist system 10 is initiated. Once the hitch assist system 10 is initiated, the controller 14 can use the sensing system 46 (FIG. 2) of the vehicle 12, to obtain vehicle 12, trailer 18, and obstacle information at step 164. It will be understood that the final vehicle heading direction $\psi$ is automatically chosen as the initial vehicle heading direction $\psi$ when the hitch assist system 10 is initiated. At step 166, the hitch assist system 10 determines a desired vehicle heading direction $\psi$, which may be input by a user U and/or predefined within the hitch assist system 10. Once the trailer 18 and the obstacles 154 proximate the vehicle 12 are located, at step 168, the hitch assist system 10 may determine the uppermost and lowermost positions $p_{um}$, $p_{lm}$. Next, the path planning method begins to derive the path from the target vehicle position where the hitch ball 26 is aligned with the coupler 16 with the predefined vehicle heading direction $\psi$.

At step 170, the controller 14 uses the path derivation routine 128 to determine whether a path 20 is feasible from the current position to the starting position. If such a path 20 is feasible, the method continues to step 182.

If a path 20 is not feasible at step 170, the method continues to step 172, where the hitch assist system 10 determines if a feasible path 20 can be obtained from the current vehicle position to the uppermost position $p_{um}$. If a path 20 does exist, the method continues to step 182.

If a path 20 is not feasible at step 172, the method continues to step 174, where the hitch assist system 10 utilizes an S-turn to move the vehicle 12 towards the forwardly disposed objects in a longitudinal direction and the starting position in a lateral direction, which may be accomplished simultaneously. Next, at step 176, the hitch assist system 10 determines whether a feasible path 20 exists from the new current position of the vehicle 12 to the starting position. If such a feasible path 20 exists, the method continues to step 182.

If a feasible path 20 does not exist at step 176, the hitch assist system 10 determines if a feasible path 20 exists from the current position of the vehicle 12 to the lowermost position $p_{lm}$ at step 178. If such a path 20 does exist, the method continues to step 182. If a path 20 is still not feasible, the method continues to step 180, where the vehicle 12 is maneuvered through an S-turn so that the vehicle 12 moves towards the trailer 18 in a longitudinal direction and starting position in a lateral direction simultaneously. Next, the method may return back to step 170 and plan more path segments until a feasible path 20 from the target vehicle position to the starting vehicle position is found.

Once the path 20 has been derived, the hitch assist system 10 may reverse the order in which the vehicle 12 is maneuvered along the segments of the path 20 at step 182. Then, the hitch assist system 10 can ask the user U to relinquish control of at least the steering wheel 88 of the vehicle 12 (and, optionally, the throttle 100 and brake, in various implementations of the hitch assist system 10 wherein the controller 14 assumes control of the powertrain control system 98 and the brake control system 96 during execution of the operating routine 130) while the vehicle 12 performs an auto hitch operation at step 182. When it has been confirmed that user U is not attempting to control steering system 80 (for example, using the torque sensor 94), the controller 14 begins to move the vehicle 12 along the determined path 20. Furthermore, the hitch assist system 10 may determine if the transmission system 102 is in the correct gear and may shift to the desired gear or prompt the user U to shift to the desired gear. The hitch assist system 10 may then control the steering system 80 to maintain the vehicle 12 along the path 20 as either the user U or the controller 14 controls the speed of the vehicle 12 using the powertrain control system 98 and the braking control system 96. Once hitch ball 26 is aligned with the coupler 16, the method 160 ends at step 184.

A variety of advantages may be derived from the use of the present disclosure. For example, use of the disclosed hitch assist system provides a system for aligning a hitch assembly with a coupler while avoiding proximately disposed obstacles. Furthermore, the hitch assist system may utilize various maneuvers, such as an S-turn for laterally and/or longitudinally altering the position of the vehicle relative the trailer. An initial heading direction of the vehicle may be entered such that the vehicle may be disposed in a predetermined direction when the hitch assembly and the coupler are aligned with one another. A user U may choose the desired heading direction and/or the hitch assist system may align with the hitch assembly and the coupler at a default heading direction.

According to some examples, a hitch assist system is provided herein. The hitch assist system includes a sensing system configured to detect a trailer and an obstacle proximate the trailer. The hitch assist system further includes a controller in communication with the sensing system and configured to define a vehicle heading direction when a hitch ball of a vehicle is aligned with a coupler of the trailer; determine an uppermost position of the vehicle; determine a lowermost position of the vehicle; and determine a vehicle path that aligns a hitch assembly of the vehicle with a coupler of the trailer within the uppermost and lowermost positions. Examples of the hitch assist system can include any one or a combination of the following features:

the coupler comprises a coupler ball socket and the hitch assembly comprises a hitch ball;
the obstacle defines the uppermost position and the trailer defines the lowermost position;
the controller determines whether a feasible path exists from an initial position to the coupler with the vehicle maneuvered in a rearward direction;
the vehicle is maneuvered forwardly to the uppermost position prior to rearward movement towards the trailer;
the vehicle is maneuvered through one or more S-turn segments to move the vehicle in a lateral direction relative to the trailer;
the vehicle is maneuvered from an initial position to the uppermost position and subsequently to the lowermost position;
the uppermost position is defined by a position in which a forward portion of the vehicle is within a predefined distance of the obstacle;
the lowermost position is defined by a position in which a rearward portion of the vehicle is within a predefined distance of the trailer;
an input device for accepting the vehicle heading direction;
the input device is a touchscreen device disposed within the vehicle;
the controller determines the vehicle path from the coupler to a current position of the vehicle through one or more segments and the vehicle performs each of the segments in the reverse order to maneuver the vehicle along the planned vehicle path; and/or
the final vehicle heading direction is automatically chosen as the initial vehicle heading direction when the hitch assist system is initiated.

Moreover, a hitch assist method is provided herein. The method includes detecting a coupler of a trailer. The method also includes detecting an uppermost position between a vehicle and an object. The method further includes detecting a lowermost position between the vehicle and the trailer. Additionally, the method includes defining a vehicle backup path having one or more non-linear segments. Lastly, the method includes aligning a hitch ball with the coupler at a predefined offset angle between the trailer and vehicle. Examples of the hitch assist method can include any one or a combination of the following features and/or steps:

According to various examples, a hitch assist system is provided herein. The hitch assist system includes a sensing system configured to detect a trailer and an obstacle proximate the trailer. The hitch assist system further includes a controller in communication with the sensing system and configured to define a vehicle heading direction when a hitch ball of a vehicle is aligned with a coupler of the trailer; maneuver the vehicle to an uppermost position proximate the obstacle; and determine a vehicle path that aligns the coupler with the hitch ball from the uppermost position. Examples of the hitch assist system can include any one or a combination of the following features:

the controller further maneuvers the vehicle to a lowermost position before returning to the uppermost position to move the vehicle in a lateral direction relative the trailer;
an input device for accepting the vehicle heading direction;
the vehicle is maneuvered through one or more S-turn segments to move the vehicle in a lateral direction relative to the trailer;
the input device is a touchscreen device disposed within the vehicle; and/or
the final vehicle heading direction is a common offset between the vehicle and the trailer as an initial offset when the hitch assist system is initiated.

It will be understood by one having ordinary skill in the art that construction of the described invention and other components is not limited to any specific material. Other exemplary examples of the invention disclosed herein may be formed from a wide variety of materials unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

Furthermore, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected" or "operably coupled" to each other to achieve the desired functionality, and any two components capable of being so associated can also be viewed as being "operably couplable" to each other to achieve the desired functionality. Some examples of operably couplable include, but are not limited to, physically mateable and/or physically interacting components and/or wirelessly interactable and/or wirelessly interacting components and/or logically interacting and/or logically interactable components. Furthermore, it will be understood that a component preceding the term "of the" may be disposed at any practicable location (e.g., on, within, and/or externally disposed from the vehicle) such that the component may function in any manner described herein.

Implementations of the systems, apparatuses, devices, and methods disclosed herein may include or utilize a special-purpose or general-purpose computer including computer hardware, such as, for example, one or more processors and system memory, as discussed herein. Implementations within the scope of the present disclosure may also include physical and other computer-readable media for carrying or storing computer-executable instructions and/or data structures. Such computer-readable media can be any available media that can be accessed by a general-purpose or special-purpose computer system. Computer-readable media that store computer-executable instructions are computer storage media (devices). Computer-readable media that carry computer-executable instructions are transmission media. Thus, by way of example, and not limitation, implementations of the present disclosure can include at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

An implementation of the devices, systems, and methods disclosed herein may communicate over a computer network. A "network" is defined as one or more data links that enable the transport of electronic data between computer systems and/or modules and/or other portable devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general-purpose or special-purpose computer. Combinations of the above should also be included within the scope of computer-readable media.

Computer-executable instructions include, for example, instructions and data, which, when executed at a processor, cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the present disclosure may be practiced in network computing environments with many types of computer system configurations, including, an in-dash vehicle computer, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through the network, both perform tasks. In a distributed system environment, program modules may be located in both local and remote memory storage devices.

Further, where appropriate, functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description and claims to refer to particular system components. As one skilled in the art will appreciate, components may be referred to by different names. This document does not intend to distinguish between components that differ in name, but not function.

It will be noted that the sensor examples discussed above might include computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Examples of the present disclosure may be implemented in further types of devices, as would be known to persons skilled in the relevant art(s).

At least some examples of the present disclosure have been directed to computer program products including such logic (e.g., in the form of software) stored on any computer usable medium. Such software, when executed in one or more data processing devices, causes a device to operate as described herein.

It is also important to note that the construction and arrangement of the elements of the invention as shown in the exemplary examples is illustrative only. Although only a few examples of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connectors or other elements of the system may be varied, the nature or number of adjustment positions provided between the elements may be varied. It will be noted that the elements and/or assemblies of the system might be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary examples without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A hitch assist system for a vehicle, the hitch assist system comprising:
   a sensing system configured to detect a trailer and an obstacle proximate the trailer, wherein the obstacle is forward of the vehicle;
   an input device for accepting a final vehicle heading direction from a plurality of vehicle heading directions relative to the trailer when a hitch ball of the vehicle is aligned with a coupler of the trailer; and
   a controller in communication with the sensing system and configured while in a hitch assist mode to:
   receive the final vehicle heading direction;
   determine an uppermost or farthest position of the vehicle from the trailer based on a position of the obstacle being at or within a predefined distance of a forward portion of the vehicle;
   determine a lowermost or nearest position of the vehicle from the trailer, wherein the trailer defines the lowermost position;
   determine a vehicle path that aligns a hitch assembly of the vehicle with a coupler of the trailer within the uppermost and lowermost positions; and
   maneuver the vehicle forwardly from an initial position to the uppermost position and subsequently rearward movement towards the trailer to the lowermost position to align the hitch ball with the coupler and to align the vehicle with the final vehicle heading direction, wherein the vehicle is maneuvered through one or more S-turn segments to move the vehicle in a lateral direction relative to the trailer.

2. The system of claim 1, wherein the coupler comprises a coupler ball socket and the hitch assembly comprises a hitch ball.

3. The system of claim 1, wherein the obstacle defines the uppermost position.

4. The system of claim 3, wherein the controller determines whether a feasible path exists from an initial position to the coupler with the vehicle maneuvered in a rearward direction.

5. The system of claim 1, wherein the uppermost position is defined by a position in which the forward portion of the vehicle is within a predefined distance of the obstacle.

6. The system of claim 1, wherein the lowermost position is defined by a position in which a rearward portion of the vehicle is within a predefined distance of the trailer.

7. The system of claim 1, wherein the input device is a touchscreen device disposed within the vehicle.

8. The system of claim 1, wherein the controller determines the vehicle path from the coupler to a current position of the vehicle through one or more segments and the vehicle performs each of the segments in the reverse order to maneuver the vehicle along the planned vehicle path.

9. The system of claim 1, wherein the final vehicle heading direction is automatically chosen as the initial vehicle heading direction when the hitch assist system is initiated.

10. A hitch assist system for a vehicle, the hitch assist system comprising:
    a sensing system configured to detect a trailer and an obstacle proximate the trailer, wherein the obstacle is forward of the vehicle;
    an input device for accepting a final vehicle heading direction from a plurality of vehicle heading directions relative to the trailer when a hitch ball of the vehicle is aligned with a coupler of the trailer; and
    a controller in communication with the sensing system and configured while in a hitch assist mode to:
    receive the final vehicle heading direction;
    maneuver the vehicle to an uppermost position proximate the obstacle, wherein the uppermost position is based on a position of the obstacle being at or within a predefined distance of a forward portion of the vehicle;
    determine a vehicle path that aligns the coupler with the hitch ball from the uppermost position; and
    maneuver the vehicle forwardly from an initial position to the uppermost position and subsequently rearward movement towards the trailer to the lowermost position to align the hitch ball with the coupler and to align the vehicle with the final vehicle heading direction, wherein the vehicle is maneuvered through one or more S-turn segments to move the vehicle in a lateral direction relative to the trailer.

11. The system of claim 10, wherein the controller further maneuvers the vehicle to a lowermost position before returning to the uppermost position to move the vehicle in a lateral direction relative the trailer.

12. The system of claim 10, wherein the input device is a touchscreen device disposed within the vehicle.

13. The system of claim 10, wherein the final vehicle heading direction is automatically chosen as the initial vehicle heading direction when the hitch assist system is initiated.

14. A hitch assist method for a vehicle operating in a hitch assist mode, comprising the steps of:
- detecting a coupler of a trailer;
- receiving with an input device a final vehicle heading direction from a plurality of vehicle heading directions relative to the trailer when a hitch ball of the vehicle is aligned with a coupler of the trailer;
- detecting an uppermost position between the vehicle and an object that is forward of the vehicle based on a position of the object being at or within a predefined distance of a forward portion of the vehicle;
- detecting a lowermost position between the vehicle and the trailer, wherein the trailer defines a lowermost position;
- defining a vehicle backup path having one or more non-linear segments;
- aligning a hitch ball with the coupler at a predefined offset angle between the trailer and vehicle; and
- maneuvering the vehicle forwardly from an initial position to the uppermost position and subsequently rearward movement towards the trailer to the lowermost position to align the hitch ball with the coupler and to align the vehicle with the final vehicle heading direction, wherein the vehicle is maneuvered through one or more S-turn segments to move the vehicle in a lateral direction relative to the trailer, and wherein the vehicle reaches the final vehicle heading direction.

* * * * *